United States Patent
Oishi et al.

(10) Patent No.: US 7,291,814 B2
(45) Date of Patent: Nov. 6, 2007

(54) GRIP HEATER CONTROL APPARATUS

(75) Inventors: Yasuo Oishi, Niiza (JP); Katsuya Okamoto, Nerima-ku (JP)

(73) Assignees: Honda Access Corp., Niiza-shi (JP); Mitsubishi Cable Industries, Ltd., Tokyo (JP)

( * ) Notice: Subject to any disclaimer, the term of this patent is extended or adjusted under 35 U.S.C. 154(b) by 119 days.

(21) Appl. No.: 11/237,952

(22) Filed: Sep. 29, 2005

(65) Prior Publication Data

US 2006/0219686 A1  Oct. 5, 2006

(30) Foreign Application Priority Data

Apr. 1, 2005  (JP) .............................. 2005-106275

(51) Int. Cl.
  *H05B 1/02*  (2006.01)
(52) U.S. Cl. ...................... 219/506; 219/202; 219/497; 219/494; 74/551.9; 74/557
(58) Field of Classification Search ........ 219/202–206, 219/494, 497, 501, 505, 507, 508; 74/551.9, 74/558.5, 557
See application file for complete search history.

(56) References Cited

U.S. PATENT DOCUMENTS 5,482,013 A * 1/1996 Andrews et al. ....... 123/179.21
5,811,884 A * 9/1998 Matuoka et al. ........... 307/10.1
6,844,524 B2 * 1/2005 Downey et al. ............ 219/204
6,903,312 B2 * 6/2005 Miura et al. ................ 219/506

FOREIGN PATENT DOCUMENTS

JP  2004-67076  3/2004
JP  2004-75047  3/2004

* cited by examiner

*Primary Examiner*—Mark Paschall
(74) *Attorney, Agent, or Firm*—Westerman, Hattori, Daniels & Adrian, LLP.

(57) ABSTRACT

A grip heater control apparatus (7) capable of increasing the opportunities to enable a heater (2) to warm a grip (1) while suppressing a voltage drop of a battery (10), the grip heater control apparatus comprising a heater (2) for generating heat by means of electric power supplied from the battery (10), the heater being provided in a grip (1) of a steering handle of a vehicle having a generator (9) for generating electricity interlocking with the rotation of an engine as a propulsive source and the battery (10) charged by the generator (9), and a heater control unit for controlling the electric energy supplied to the heater (2) from the battery (10), wherein a revolutions detecting unit is provided for detecting the number of revolutions of the engine or the generator (9) and the heater control unit includes a unit for determining an upper limit on the upper limit electric energy supplied to the heater (2) depending on the detected number of revolutions.

8 Claims, 13 Drawing Sheets

GRIP HEATER CONTROL APPARATUS

BACKGROUND OF THE INVENTION

1. Field of the Invention

The present invention relates to a control apparatus for a heater provided in a grip of a steering handle of a vehicle such as a motorcycle, a snowmobile, or a wet bike.

2. Related Background Art

Conventionally, there is an already known technology of providing a comfortable driving environment for a driver by providing a heater (an electric heater) in a grip (a part gripped by the driver) of a steering handle and controlling the amount of electricity supplied to the heater to warm the grip in a vehicle having an engine as a propulsive source such as a motorcycle, a snowmobile, and a wet bike (for example, refer to Japanese Laid-Open Patent Publication No. 2004-75047 (hereinafter, referred to as patent document 1)). The apparatus in the patent document 1 has a variable resistor in a circuit for controlling the amount of electricity supplied to the heater and adjusts the amount of electricity supplied to the heater by changing a resistance value of the variable resistor with a dial control for adjusting a temperature provided at the end of the grip to adjust a temperature of the heater.

Moreover, a battery used for supplying electric power to the heater supplies electric power to an electric system of the entire vehicle such as a starter motor or lamp, and thus the heater control of the grip is an appendant for the vehicle. Therefore, there is a need to give priority to traveling of the vehicle when supplying battery electric power. Therefore, there has been suggested a grip heater control apparatus for halting power supply from the battery to the heater before the battery voltage drops below a minimum voltage required to start the engine (drive the starter motor) (for example, refer to Japanese Laid-Open Patent Publication No. 2004-67076 (hereinafter, referred to as patent document 2)).

The heater control apparatus in the patent document 2 performs heating by controlling electricity supplied to the heater from the battery by the PWM control in response to a switch operation for temperature adjustment performed by a driver. Moreover, the control circuit is provided with a battery voltage detection and determination unit for detecting a battery voltage. Where the battery voltage has reached a predetermined voltage close to the minimum voltage required to drive the starter motor, the battery voltage detection and determination unit forcibly turns off the electricity to the heater and notifies the driver of the battery voltage drop.

On the other hand, the battery is charged by a power generator for generating electricity interlocking with the rotation of the engine. Thus, the amount of power generation of the generator becomes smaller in proportion as the number of engine revolutions decreases.

In the grip heater control apparatus disclosed in the patent document 1, however, if the driver operates the dial for temperature adjustment to increase the temperature of the heater at a low engine speed, the amount of electricity to the heater becomes excessive relative to the amount of power generation of the generator, which could lead to a situation where the battery voltage drops below a minimum voltage required to drive the starter motor. Meanwhile, in the grip heater control apparatus disclosed in the patent document 2, the battery voltage can be prevented from dropping below the minimum voltage required to drive the starter motor, but the heater is forcibly turned off more frequently by the operation of the switch for temperature adjustment to increase the amount of electricity to the heater at a low engine speed. This increases the occasions where the driver cannot warm the grip when he desires. Particularly when the battery supplies power to a lamp or other electric equipment other than the heater or when the battery voltage cannot go up enough due to the battery deterioration, the grip heater control apparatus has a disadvantage of increasing the cases where the driver substantially cannot operate the heater.

SUMMARY OF THE INVENTION

It is therefore an object of the present invention to provide a grip heater control apparatus that makes it possible to increase opportunities to warm a grip by means of a heater while reducing the battery voltage drop by resolving these disadvantages.

To achieve the above object, according to a first aspect of the present invention, there is provided a grip heater control apparatus comprising a heater for generating heat by means of electric power supplied from a battery, the heater being provided in a grip of a steering handle of a vehicle having an engine as a propulsive source, a generator for generating electricity interlocking with (or in proportion to) the rotation of the engine, and the battery charged by the generator, and a heater control unit for controlling the electric energy supplied to the heater from the battery, wherein a revolutions detecting unit is provided for detecting the number of revolutions of the engine or the generator and the heater control unit includes a unit for determining an upper limit of the electric energy supplied to the heater depending on the detected number of revolutions.

According to the grip heater control apparatus of the first aspect, there is provided the revolutions detecting unit for detecting the number of revolutions of the engine or the generator and the heater control unit determines the upper limit of the electric energy supplied to the heater depending on the detected number of revolutions. This makes it possible to restrict the upper limit on the electric energy to the heater in such a way as to lower the upper limit on the electric energy to the heater in proportion as the number of revolutions is lower (in proportion as the amount of power generation of the generator is smaller). As a result, it becomes possible to increase the opportunities where the grip can be warmed by the heater while preventing a battery voltage drop.

According to a second aspect of the present invention, there is provided a grip heater control apparatus comprising a heater for generating heat by means of electric power supplied from a battery, the heater being provided in a grip of a steering handle of a vehicle having an engine as a propulsive source, a generator for generating electricity in proportion to the rotation of the engine, and the battery charged by the generator, and a heater control unit for controlling the electric energy supplied to the heater from the battery, wherein a revolutions detecting unit is provided for detecting the number of revolutions of the engine or the generator and the heater control unit includes a unit for controlling the electric energy so as to be lower than a maximum electric energy that can be supplied to the heater at least when the detected number of revolutions is equal to or lower than a predetermined number of revolutions. The term maximum electric energy refers to the set maximum electric energy and the physical maximum electric energy.

According to the grip heater control apparatus of the second aspect, there is provided the revolutions detecting unit for detecting the number of revolutions of the engine or the generator and the heater control unit controls the electric energy supplied to the heater so as to be lower than the maximum electric energy that can be supplied to the heater when the detected number of revolutions is equal to or lower than the predetermined number of revolutions. This makes it possible to control the electric energy to the heater so as to suppress the electric energy to the heater in the case of a small number of revolutions and low power generation of the generator. Consequently, it becomes possible to increase the opportunities where the grip can be warmed by the heater while reducing the battery voltage drop.

In this regard, preferably the grip heater control apparatus of the first aspect more specifically comprises an upper limit electric energy setting unit for setting the upper limit electric energy to the heater based on the number of revolutions detected by the revolutions detecting unit, wherein the heater control unit controls the electric energy supplied to the heater to be equal to or lower than the set upper limit electric energy.

According thereto, the upper limit electric energy setting unit sets the upper limit electric energy to the heater based on the detected number of revolutions and thus it is possible to set the upper limit electric energy appropriate for the amount of power generation of the generator. Then, the electric energy supplied to the heater is controlled so as to be equal to or lower than the set upper limit electric energy, whereby the electric energy supplied to the heater is not excessive relative to the amount of power generation of the generator and thus the electric energy supplied to the heater can be controlled in such a way as to suppress the electric power consumption of the battery.

Furthermore, preferably the electric energy supplied to the heater is controlled in such a way as to achieve the temperature as close as possible to the temperature meeting a driver's request. Therefore, preferably the grip heater control apparatus of the first aspect further comprises a heater temperature actuator operated by a driver for adjusting a temperature of the heater, an operation signal output unit for outputting a signal corresponding to an operation of the heater temperature actuator, and a target electric energy setting unit for setting a target electric energy to the heater based on an output of the operation signal output unit, wherein the heater control unit controls the electric energy supplied to the heater to be a lower lower one of the target electric energy and the upper limit electric energy.

According thereto, the heater control unit controls the electric energy supplied to the heater to be a lower one of the target electric energy, namely the electric energy to the heater required by the driver and the upper limit electric energy. Therefore, if the target electric energy is lower than the upper limit electric energy, the electric energy to the heater is controlled to the target electric energy, whereby the heater can be set to a temperature meeting the driver's request. If the target electric energy is higher than the upper limit electric energy, the electric energy to the heater is controlled to be the upper limit electric energy, whereby the grip can be warmed by the heater while reducing the battery voltage drop.

Moreover, in the grip heater control apparatus of the first aspect, preferably the heater control unit controls the electric energy supplied to the heater to be a lower one of the target electric energy and the upper limit electric energy if the detected number of revolutions is equal to or lower than a predetermined number of revolutions and controls the electric energy to the heater to be the target electric energy if the detected number of revolutions is higher than the predetermined number of revolutions. Alternatively, if the detected number of revolutions is higher than the predetermined number of revolutions, the upper limit electric energy setting unit preferably sets the upper limit electric energy to a value equal to or higher than the target electric energy.

According thereto, if the detected number of revolutions is higher than the predetermined number of revolutions, the electric energy to the heater is always controlled to be equal to the target electric energy. Therefore, if the number of revolutions is high and the amount of power generation of the generator is sufficiently large for the electric energy necessary for the heater, the heater can be set to a temperature meeting the driver's request without limitation on the electric energy to the heater.

Moreover, in the grip heater control apparatus according to the first aspect, the upper limit electric energy setting unit sequentially compares the detected number of revolutions with a predetermined threshold. If the threshold is a fixed value in a situation where the upper limit electric energy setting unit sets the upper limit electric energy while changing it in stages according to a change in magnitude relation between the number of revolutions and the threshold, the upper limit electric energy is inevitable to be changed frequently due to changes in the number of revolutions of the generator or the engine when the detected number of revolutions is in the vicinity of the threshold. Therefore, a first threshold compared with the number of revolutions when it is increasing and a second threshold compared with the number of revolutions when it is decreasing are preferably set to be different.

According thereto, the upper limit electric energy setting unit sequentially compares the detected number of revolutions with the corresponding threshold to increasing and decreasing in revolution and sets the upper limit electric energy while changing it in stages according to the change in magnitude relation between the number of revolutions and the threshold. Therefore, the change in the upper limit electric energy relative to the change in the number of revolutions can be provided with hysteresis characteristics, thereby preventing an unstable operation, which may be caused by changes in the upper limit electric energy repeated many times due to a variation in the number of engine revolutions.

In the present invention, it is not always required to have an arrangement for halting the power supply to the heater from the battery before the battery voltage drops below the minimum voltage required to start the engine (to drive the starter motor). The grip heater control apparatus of the first or second aspect, however, may comprise a battery voltage detecting unit for detecting the battery voltage, wherein, if the battery voltage detected drops to a predetermined voltage or lower, the heater control unit stops supplying electricity to the heater. This prevents the battery voltage from excessively dropping away (for example, dropping below the minimum voltage required to drive the starter motor), which may be caused by supplying the electricity to the heater or to the lamp or other electric equipment other than the heater.

BRIEF DESCRIPTION OF THE DRAWINGS

The above and other objects, features and advantages of the present invention will become apparent from the following detailed description when taken with the accompanying drawing in which.

DETAILED DESCRIPTION OF THE PREFERRED EMBODIMENTS

The preferred embodiment of the present invention will now be described in detail hereinafter with reference to the accompanying drawings. In this embodiment, an autobicycle (motorcycle) is taken for example as a vehicle provided with a grip heater control apparatus, which is the embodiment of the present invention.

Figure 1:
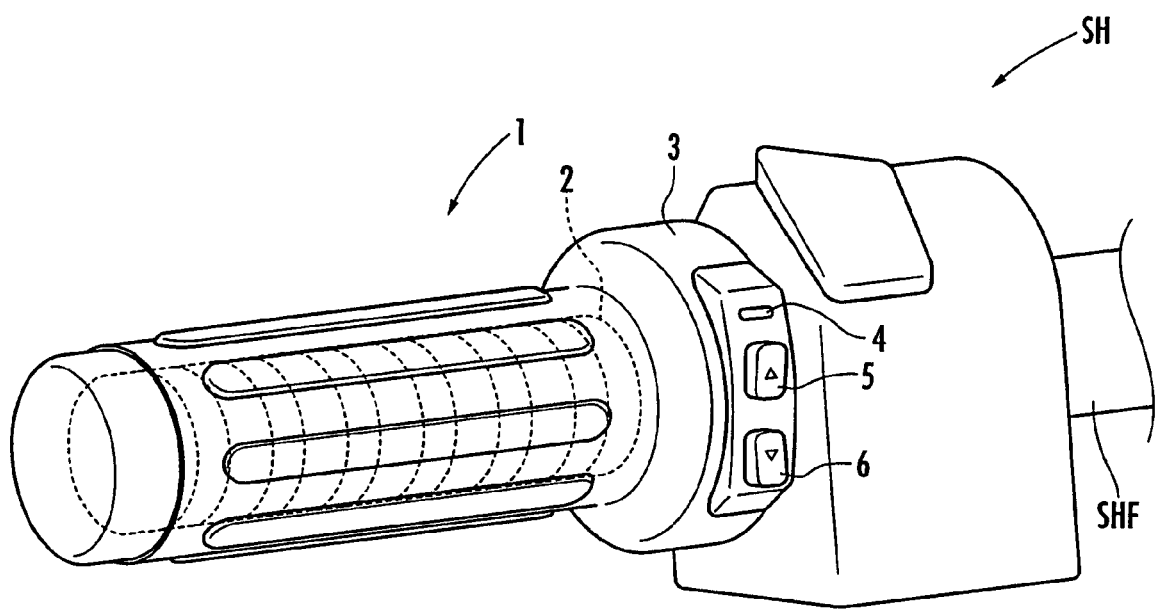
FIG. 1 is an overview diagram of a left grip of a vehicle provided with a grip heater control apparatus according to an embodiment of the present invention.

First, referring to FIG. 1, there is shown the grip heater control apparatus according to the embodiment for controlling the electric energy to a heater (electric heater) 2 made of a flexible printed-wiring board or the like incorporated in each of a left grip 1 and a right grip not shown, each of which is provided in a steering handle SH of the motorcycle. The left grip 1 and the right grip are made of rubber or other resin each in the form of a cylinder with a bottom and inserted around each end (the left end and the right end) of a frame SHF of the steering handle SH, respectively. The heater 2 for the left grip 1 is placed between the internal perimeter surface of the grip 1 and the peripheral surface of the frame SHF of the steering handle SH and the heater 2 warms the left grip 1 by means of heat generation. While not shown, the heater for the right grip is arranged similarly to the heater 2. In the following description, the heater for the right grip bears a reference numeral 2, too.

Moreover, a flange 3 formed at the right end (the end relatively closer to the center of the motorcycle) of the left grip 1 is provided with an LED 4 for notifying the driver of the conditions of electricity supplied to the heaters 2, 2 by indicating the conditions and provided with an up switch 5 and a down switch 6 as heater temperature operators operated by the driver to adjust the temperatures of the heaters 2, 2 (more accurately, to set the electric energy to the heaters 2, 2). The up switch 5 is of the pressing operation type where the switch is operated to increase the temperatures (the electric energy) of the heaters 2, 2 or to start the power supply to the heaters 2, 2. The down switch 6 is of the pressing operation type where the switch is operated to decrease the temperatures (the electric energy) of the heaters 2, 2 or to halt the power supply to the heaters 2, 2.

Subsequently, with reference to FIG. 2, there is shown the grip heater control apparatus 7 in this embodiment comprising a controller 8 made of an electronic circuit and the like, the heaters 2, 2, the LED 4, the up switch 5, and the down switch 6. The grip heater control apparatus 7 is mounted on the motorcycle and is connected to a generator 9 for generating electric power interlocking with the revolutions of an engine not shown and to a battery 10 charged by the generator 9. The engine is a propulsive source of the motorcycle.

The generator 9 is, for example, a three phase AC generator (ACG) with its rotor connected to an output shaft of the engine so as to rotate interlocking with the rotation of the output shaft of the engine. The amount of power generation of the generator 9 decreases in proportion as the number of engine revolutions (the rotational speed of the output shaft) is lower. Moreover, the rotor of the generator 9 is connected to a pickup rotor 29, which is a metal plate having nine pawl projections 29a in the periphery, coaxially with the rotor. In the vicinity of the pickup rotor 29, there is provided a pickup coil 30 for outputting a pickup signal corresponding to the rotation of the pickup rotor 29. The pickup coil 30 sequentially faces respective projections 29a during rotation of the pickup rotor 29 and outputs a pickup signal in the form of a pulse each time. Thereby, the pickup signal corresponding to the number of revolutions of the generator 9 (the rotational speed of the rotor) is output and it is input to the controller 8.

Figure 3:
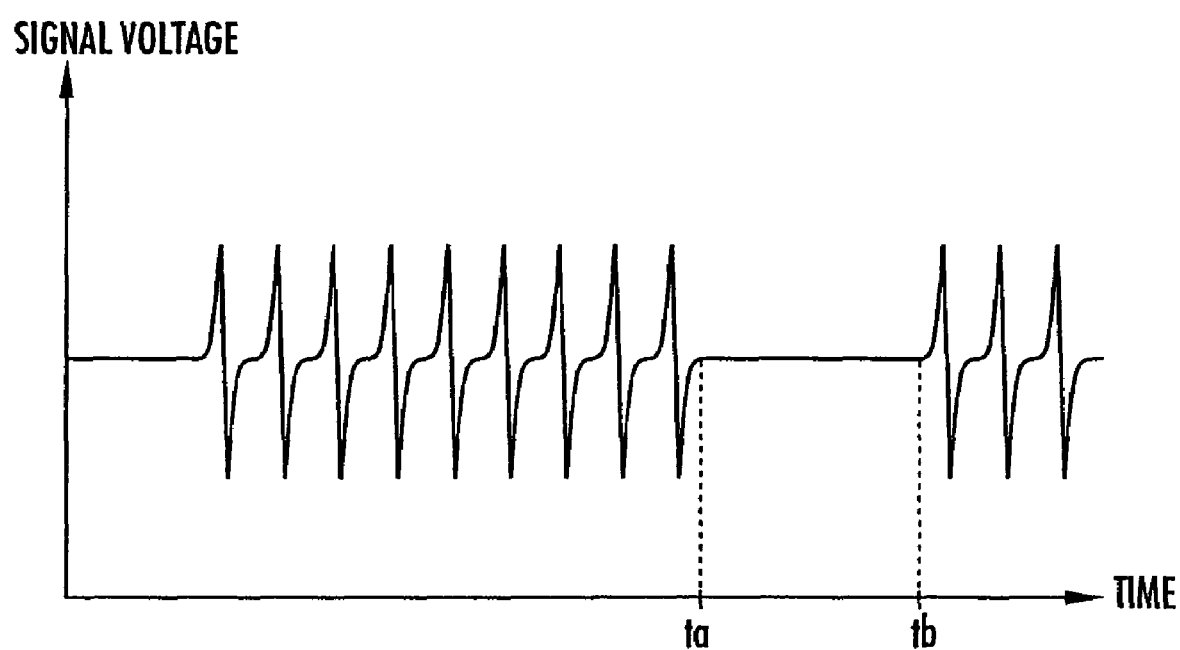
FIG. 3 is a graph showing an hourly variation of a pickup signal in the grip heater control apparatus shown in FIG. 2.

Referring to FIG. 3, there is shown a graph illustrating an hourly variation of the pickup signal output from the generator 9 to the controller 8, having an axis of ordinate representing signal voltage and an axis of abscissa representing time. The pickup signal indicates a waveform having a cycle corresponding to the number of revolutions of the generator 9, where the cycle becomes shorter in proportion as the number of revolutions of the generator 9 increases. In the generator 9 of this embodiment, the projections 29a of the pickup rotor 29 are not arranged at regular intervals on the perimeter of the rotor 29. Therefore, even if the rotor of the generator 9 is continuously rotating, there appears a period in which no pickup signal is output periodically like the period ta to tb in FIG. 3.

The battery 10 is, for example, a lead battery and for use in supplying power to the entire electric system of the motorcycle. The battery 10 has a negative electrode 10a and a positive electrode 10b connected to the generator 9 via a rectifier circuit 31 and is charged by a DC voltage provided by rectifying the voltage of generated power of the generator 9 using the rectifier circuit 31. In this regard, the rectifier circuit 31 is, for example, a full-wave rectifier circuit or a half-wave rectifier circuit. The battery 10 has a negative electrode 10a connected to ground and a positive electrode 10b connected in series with a main switch 11 and a fuse 12 of the motorcycle and is connected to the controller 8 in such a way as to supply an output voltage of the battery 10 to the controller 8 via the main switch 11 and the fuse 12.

Moreover, the battery 10 is connected to the heaters 2, 2 in such a way as to supply electricity to the heaters 2, 2 via the main switch 11 and the fuse 12. For more detail, the heaters 2, 2 are connected in series, with one end of the series circuit is connected to the positive electrode 10b of the battery 10 via the main switch 11 and the fuse 12 and the other end of the series circuit is connected to the controller 8. In this condition, the other end of the series circuit of the heaters 2, 2 is connected to ground or released by a heater output I/F 20 described later in the controller 8 and the battery 10 supplies electricity to the series circuit of the heaters 2, 2 when it is connected to ground.

The controller 8 is housed in, for example, a housing (not shown) of a head lamp of the motorcycle and comprises a CPU 13 for performing a control operation, a clock generating section 14 for generating a clock signal to the CPU 13, and an external reset circuit 15 for initializing the CPU 13. The controller 8 further comprises a power supply input section 16 supplied with an output voltage of the battery 10 (hereinafter, referred to as a battery voltage), a 5V power supply section 17 for generating and outputting a constant voltage Vdd of 5V from the output voltage of the power input section 16, and a power supply voltage dividing section 18 for outputting divided voltage Vs provided by dividing the output voltage of the power input section 16.

The controller 8 still further comprises an ACG signal input I/F 19 for receiving the pickup signal output from the generator 9 and outputting a pulse signal in synchronization with the pickup signal to the CPU 13 and a heater output I/F 20 for controlling the supply of electricity to the heater 2 from the battery 10 and its interruption according to an instruction of the CPU 13 to control the electric energy to the heater 2 (PWM control). The electric energy to the heater 2 can be set in six stages of level 0 to level 5 according to the operations of the up switch 5 and the down switch 6. At the level 0, the heater 2 is in the OFF state (the de-energized condition of the heater 2). The electric energy to the heater 2 is larger in proportion as the level is higher. In the present specification, "I/F" means an interface circuit.

Moreover, the controller 8 further comprises an LED output I/F 21 for turning on or off the LED 4 according to the output (operating instruction signal) from the CPU 13, an up switch input I/F 22 for generating a signal according to an operation of the up switch 5 and outputting it to the CPU 13, and a down switch input I/F 23 for generating a signal according to an operation of the down switch 6 and outputting it to the CPU 13.

Figure 4:
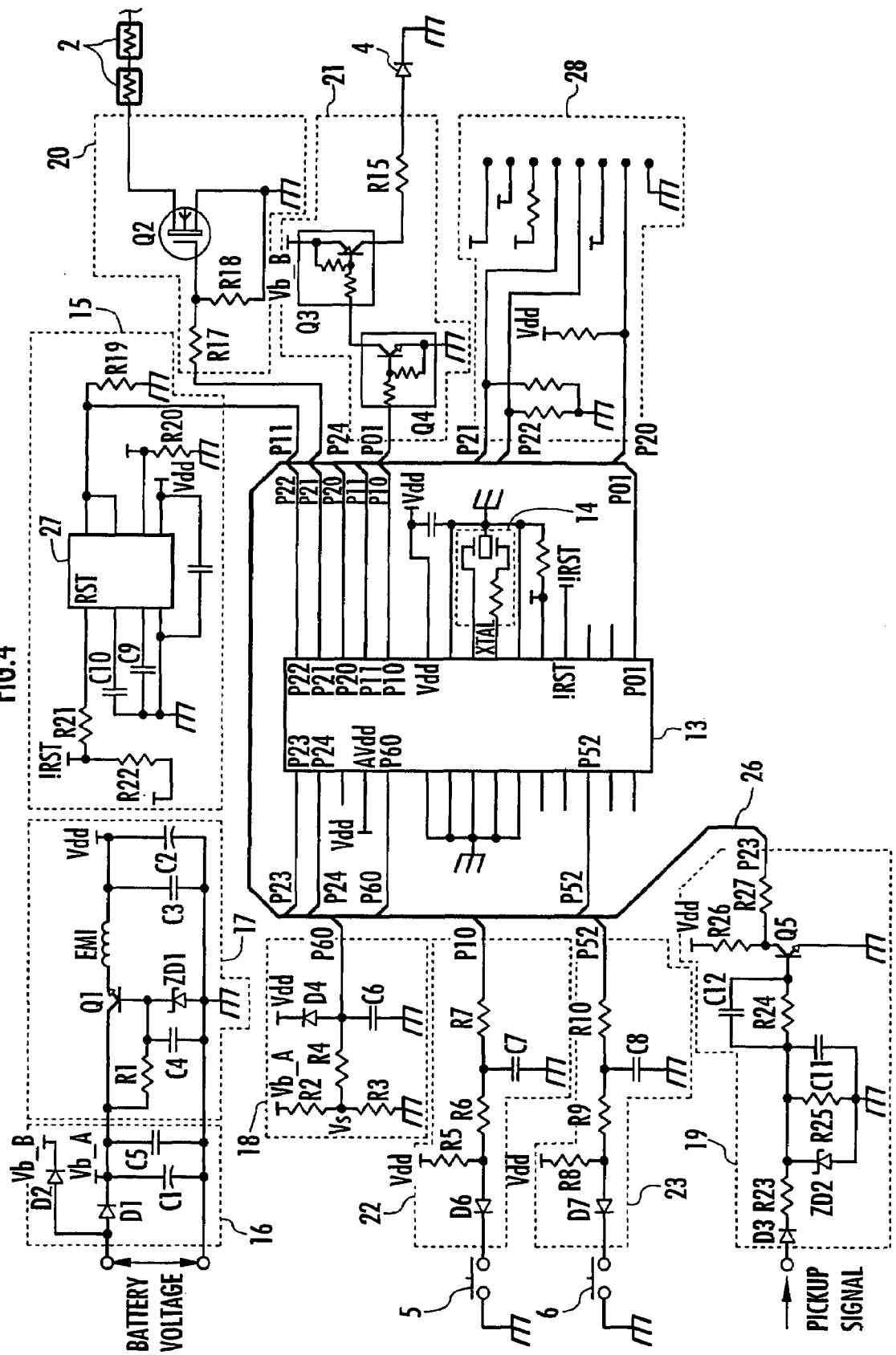
FIG. 4 is a circuit diagram of the grip heater control apparatus shown in FIG. 2.

The following sections provide a more detailed description of the controller 8 with reference to FIG. 4. The CPU 13 is connected to the external reset circuit 15, the power supply voltage dividing section 18, the ACG signal input I/F 19, the heater output I/F 20, the LED output I/F 21, the up switch input I/F 22, and the down switch input I/F 23 via a signal line group 26 formed by a plurality of bundled signal lines connected to terminals of the CPU 13, respectively. In FIG. 4, a reference numeral Pnm (n and m are integers) in the CPU 13 and a reference numeral Pnm written near the signal line group 26 indicate relations between the terminals of the CPU 13 and the circuits connected to the terminals via the signal line group 26. For example, "P23" indicates that the terminal P23 of the CPU 13 is connected to the ACG signal input I/F 19 via the signal line group 26.

The power supply input section 16 includes diodes D1, D2, an electrolytic capacitor C1, and a capacitor C5 connected as shown, a battery voltage (fluctuating due to the voltage of power generated by the generator 9) supplied from the battery 10 is supplied to charge the electrolytic capacitor C1 via the rectifier diode D1 and the battery voltage charged in the electrolytic capacitor C1 is supplied to the 5V power supply section 17 and the power supply voltage dividing section 18. The capacitor C5 is for use in removing noise components from the charging voltage of the electrolytic capacitor C1. The power supply input section 16 supplies the battery voltage, which is supplied from the battery 10, to the LED output I/F 21 via the diode D2. Hereinafter, a reference character Vb_A is appended to the battery voltage charged to the electrolytic capacitor C1 and a reference character Vb_B is appended to the battery voltage output from the diode D2. The reference characters Vb_A and Vb_B indicate almost equal voltages (for example, 12V), while Vb_A is more stable than Vb_B.

In this embodiment, the battery voltage (Vb_A) supplied to the 5V power supply section 17 and to the power supply voltage dividing section 18 is separated from the battery voltage (Vb_B) supplied to the LED output I/F 21 as two circuits via the diodes D1, D2, whereby the power supply voltage dividing section 18 is less affected by the battery voltage fluctuation caused by blinking of the LED 4 (ON or OFF of the LED 4).

The 5V power supply section 17 includes a transistor Q1, a resistor R1, a capacitor C4, a Zener diode ZD1, a coil for EMI (electromagnetic interference), a capacitor C3, and an electrolytic capacitor C2 connected as shown, basically generating a constant voltage Vdd of 5V from the battery voltage Vb_A supplied from the power supply input section 16 by means of a circuit composed of the transistor Q1, the Zener diode ZD1, and the resistor R1 and outputting and charging it to the electrolytic capacitor C2. The capacitor C4, the coil for EMI, and the capacitor C3 are for use in removing noise components from the constant voltage Vdd. The constant voltage Vdd is used as a power supply voltage for the CPU 13, the external reset circuit 15, the ACG signal input I/F 19, the up switch input I/F 22, and the down switch input I/F 23.

The power supply voltage dividing section 18 includes resistors R2, R3, and R4, a diode D4, and a capacitor C6 connected as shown, outputting a divided voltage Vs produced by dividing the battery voltage Vb_A input to the power supply input section 16 by the serially connected resistors R2 and R3 to an input terminal P60 of the CPU 13 via the resistor R4 and the signal line group 26. The divided voltage Vs is a voltage signal indicating the level of the battery voltage Vb_A. The capacitor C6 is for use in removing noise components from the divided voltage Vs. The diode D4 is for use in preventing the divided voltage Vs from exceeding the constant voltage Vdd, which is a power supply voltage of the CPU 13.

The ACG signal input I/F 19 includes a diode D3, a resistor R23, a Zener diode ZD2, resistors R25, R24, capacitors C11, C12, a transistor (switching transistor) Q5, and resistors R26, R27 connected as shown. The ACG signal input I/F 19 rectifies a pickup signal input from the generator 9 using the diode D3, further limiting the peak value of the rectified signal to 5V using the Zener diode ZD2, and then rectifying it into rectangular waves via a filter composed of the resistors R25, R24 and the capacitors C11, C12 before inputting the pickup signal to the base of the transistor Q5. The transistor Q5 has an emitter connected to ground and a collector to which a constant voltage Vdd is applied via the resistor R26 from the 5V power supply section 17. Therefore, the transistor Q5 is turned on or off in synchronization with the pickup signal, thereby generating a pulse signal in synchronization with the pickup signal at the collector of the transistor Q5. The pulse signal is a rectangular wave signal, which is set to 0V when the pickup signal is at a positive voltage and rises from 0V to Vdd (5V) when the pickup signal falls down from the positive voltage to the negative voltage. The pulse signal is output to the input terminal P23 of the CPU 13 via the resistor R27 and the signal line group 26.

The heater output I/F 20 includes a transistor (FET) Q2 and resistors R17, R18 connected as shown between the CPU 13 and the series circuit of the heaters 2, 2, turning on or off the transistor Q2 by means of a command signal (a high- or low-voltage signal) applied to a gate of the transistor Q2 from the terminal P21 of the CPU 13 via the signal line group 26 and the resistor R17. In this condition, the transistor Q2 is turned on during the period in which the command signal from the terminal P21 of the CPU 13 is at the high voltage (5V). At this moment, the battery 10 supplies electricity (the battery 10 supplies electric power) to the series circuit of the heaters 2, 2 connected to the drain of the transistor Q2. Meanwhile, the transistor Q2 is turned off during the period in which the command signal from the terminal P21 of the CPU 13 is at the low voltage (about 0V). At this moment, electricity supplied to the series circuit of the heaters 2, 2 is interrupted.

The LED output I/F 21 includes transistors (switching transistors) Q3, Q4 and a resistor R15 connected as shown between the CPU 13 and the LED 4, turning on or off the transistors Q3, Q4 by means of a command signal (a high- or low-voltage signal) applied to the base of the transistor Q4 via the signal line group 26 from a terminal P10 of the CPU 13. In this condition, the battery voltage Vb_B is applied to the emitter of the transistor Q3 from the power supply input section 16 and the LED 4 is connected to the collector of the transistor Q3 via the resistor R15. Then, the transistors Q3, Q4 are both turned on during the period in which the command signal from the terminal P10 of the CPU 13 is at the high voltage (5V). At this moment, the power supply input section 16 applies the battery voltage Vb_B to the LED 4 via the transistor Q3 and the resistor R15, whereby the LED 4 is energized and turned on. Meanwhile, the transistors Q3, Q4 are both turned off during the period in which the command signal from the terminal P10 of the CPU 13 is at the low voltage (0V), whereby the electricity supplied to the LED 4 is interrupted and turned off.

The up switch input I/F 22 includes a diode D6, resistors R5, R6, and a capacitor C7, and a resistor R7 connected as shown between the up switch 5 and the CPU 13. It outputs a charging voltage of the capacitor C7, which is charged by the constant voltage Vdd via the resistors R5, R6 from the 5V power supply section 17, to the CPU 13 via the resistor R7 and the signal line group 26 in the stationary state in which the up switch 5 is not pressed. When the up switch 5 is pressed, the capacitor C7 is grounded via the resistor R6, the diode D6, and the up switch 5. In this condition, if the up switch 5 is pressed and held for a predetermined period of time (for example, 0.5 msec), the charging voltage of the capacitor C7 drops from the constant voltage Vdd to the low voltage (approx. 0V). Then, the low voltage is output from the capacitor C7 to the CPU 13 via the resistor R7 and the signal line group 26 as a signal indicating that the up switch 5 is pressed.

The down switch input I/F 23 includes a diode D7, resistors R8, R9, a capacitor C8, and a resistor R10 connected between the down switch 6 and the CPU 13 in a similar arrangement to that of the up switch input I/F 22. Therefore, the output (the charging voltage of the capacitor C8) of the down switch input I/F 23 to the CPU 13 is a constant voltage Vdd in the stationary state in which the down switch 6 is not pressed. If the down switch 6 is pressed and held for a predetermined period of time (for example, 0.5 msec), the charging voltage of the capacitor C8 drops from the constant voltage Vdd to the low voltage (approx. 0V). The up switch input I/F 22 and the down switch input I/F 23 correspond to the operation signal output units of the present invention.

The external reset circuit 15 is provided with a reset IC 27 in which a plurality of resistors (R19 and the like) are connected to a plurality of capacitors (C9 and the like), appropriately initializing an operation of the CPU 13 by means of the reset IC 27. In this condition, the external reset circuit 15 outputs a reset signal to a terminal !RST of the CPU 13 to initialize the operation of the CPU 13 if an output (a clear signal) from a terminal P11 of the CPU 13 is not output after an elapse of a predetermined period of time or if the voltage of the CPU 13 under operation is abnormal.

The clock generating section 14 is provided with a crystal resonator XTAL connected to the CPU 13, generating a clock signal having a constant frequency using the crystal resonator and inputting it to the CPU 13.

In FIG. 4, the circuit indicated by a reference numeral 28 is a memory processing circuit. The memory processing circuit 28 is an I/F related to a flash memory (not shown) used for the CPU 13 to read or write data.

Figure 2:
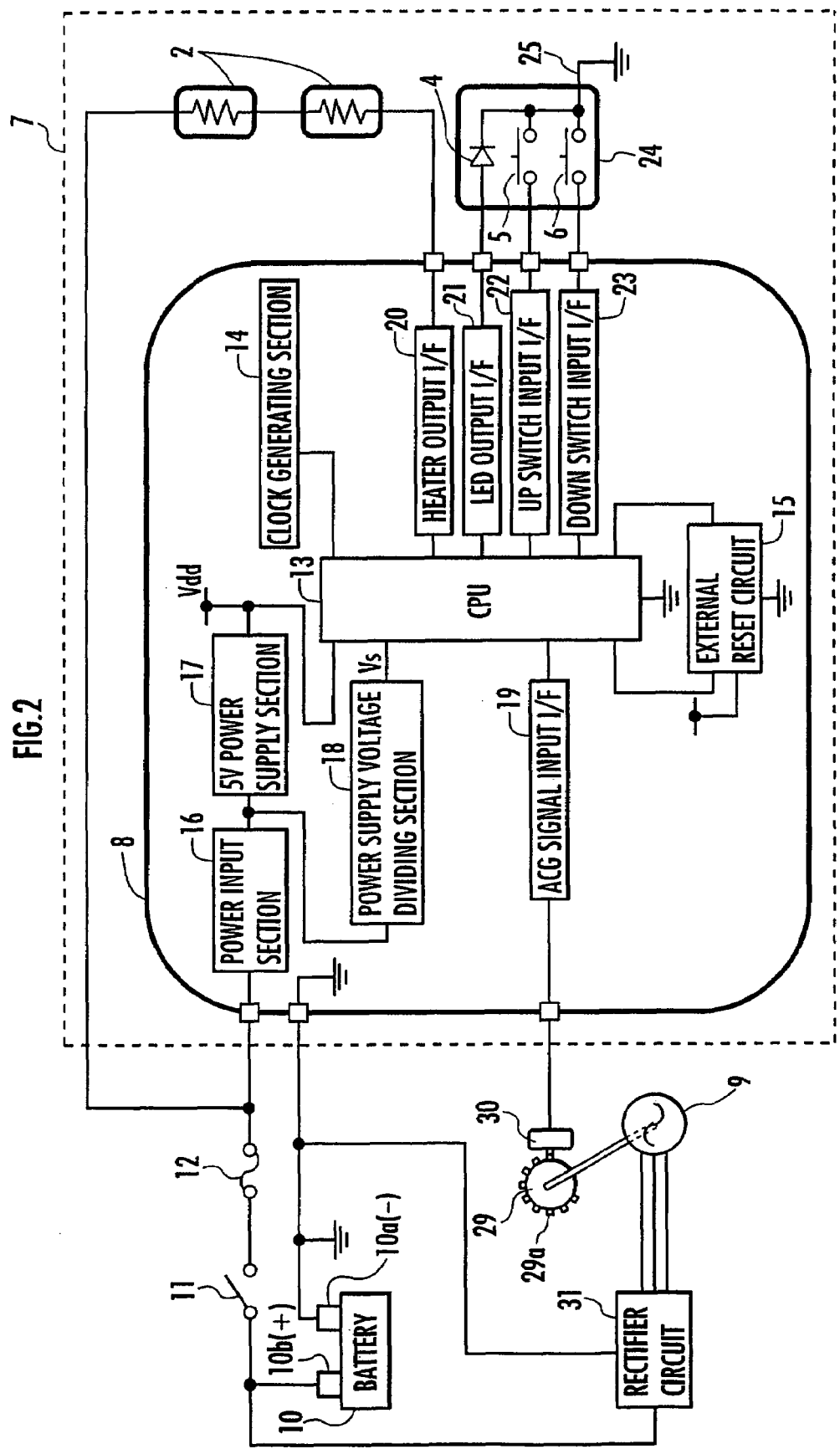
FIG. 2 is a system block diagram of the grip heater control apparatus according to the embodiment of the present invention.

In this embodiment, the LED 4, the up switch 5, and the down switch 6 are connected to ground via a common ground wire (earth wire) 25 in the form of an assembly 24 as shown in FIG. 2. In this condition, the LED 4 is connected at the cathode side to the ground wire 25 to reach the ground and is connected at the anode side to the LED output I/F 21 of the controller 8 so that the LED output I/F 21 flows current for turning on the LED 4 to the LED 4. Therefore, there is no need to connect two exclusive connecting wires for driving the LED 4 to the assembly 24 of the LED 4, the up switch 5, and the down switch 6 (only one exclusive connecting wire is required for the LED 4), thereby reducing the number of connecting wires to be connected to the assembly 24 and downsizing the assembly 24.

The CPU 13 is driven by the constant voltage Vdd input from the 5V power supply section 17 and initialized by the external reset circuit 15. The CPU 13 has a function of detecting a cycle of a pulse signal input from the ACG signal input I/F 19 (a mean wave period, which is hereinafter referred to as ACG cycle) as an indication of the number of revolutions of the engine or the generator 9 by means of a program or the like written into a ROM not shown (corresponding to the revolutions detecting unit of the present invention). The CPU 13 has a function of setting the upper limit electric energy to the heater 2 according to the ACG cycle (the upper limit electric energy setting unit of the present invention). Moreover, the CPU 13 has a function of setting target electric energy to the heater 2 according to input from the up switch input I/F 22 and from the down switch input I/F 23 (the target electric energy setting unit of the present invention).

Furthermore, the CPU 13 has a function of detecting a battery voltage by using a divided voltage Vs input from the power supply voltage dividing section 15 and determining a battery voltage drop by comparing the detected value with a predetermined voltage (the battery voltage detecting unit of the present invention). Alternatively, the battery voltage drop may be determined based on an average corrected battery voltage obtained by averaging a corrected battery voltage, which is a result of adding a voltage drop or an error in the output of the power supply voltage dividing section 15 that occurs in wiring for connecting the controller 8 to the battery 10 to the detected value of the battery voltage.

Still further, the CPU 13 determines the electric energy supplied to the heater 2 to be smaller electric energy between the upper limit electric energy to the heater 2 and the target electric energy, then outputs a command signal to the heater output I/F 20 according to the determined electric energy, controls the ratio between the ON time and the OFF time for which the battery 10 supplies electricity to the heater 2, and adjust the electric energy to the heater 2 by adjusting the current which flows to the heater 2 (adjust the electric energy to the heater 2 by means of the PWM control). Moreover, the CPU 13 outputs an OFF signal to the heater output I/F 20 (a command signal for turning off the transistor Q2 of the heater output I/F 20) in the case of a battery voltage drop and turns off the heater 2 (set the electric energy to the heater 2 to zero). These functions of adjusting the electric energy to the heater 2 correspond to the heater control unit of the present invention.

The CPU 13 outputs a command signal to the LED output I/F 21 according to a failure of the switch 5 or 6, a battery voltage drop, or the electric energy to the heater 2 to perform an on-off control of the LED 4.

The following describes the operation of the system according to this embodiment. The outline of the entire operation is described, first. In the main control process of the grip heater control apparatus 7 (the main control process of the CPU 13), a battery voltage detecting process, a switch input process, a heater output process, and an indicator output process are sequentially repeated. The timings for executing these processes are determined by a timer interrupt process.

In the battery voltage detecting process, the CPU 13 detects a battery voltage by using a divided voltage Vs input from the power supply voltage dividing section 18, determines whether the detected voltage value exceeds a predetermined voltage (for example, a slightly higher voltage than the minimum voltage required to start the engine (to drive the starter motor)), and detects a condition where the battery voltage drops (the battery voltage drop condition).

In the switch input process, the CPU 13 monitors an ON input (a low-voltage signal indicating that the switch 5 or 6 is pressed) and an OFF input (a high-voltage signal indicating that the switch 5 or 6 is not pressed) input from the up switch input I/F 22 or the down switch input I/F 23 for each switch 5 or 6. Then, it is determined whether the ON input is entered from the switch 5 or 6 for a predetermined period of time or longer, whether the ON input is entered from the up switch 5 and the down switch 6 simultaneously, or the like to detect the condition of a failure in the switch 5 or 6 (switch failure condition) and the operation of the switches 5, 6 for adjusting the temperature of the heater 2.

In the heater output process, the CPU 13 outputs a command signal to the heater output I/F 20 to turn off the heater 2 if the battery voltage drop condition is detected in the battery voltage detecting process. Moreover, the level of the target electric energy to the heater 2 is set based on the operation of the switch 5 or 6 detected in the switch input process and the set level of the target electric energy is compared with the level of the upper limit electric energy to the heater 2 to determine the heater output level (actual electric energy supplied to the heater 2). The level of the upper limit electric energy is set based on the ACG cycle in an ACG input interrupt process described later. Furthermore, a heater ON_DUTY is set according to the determined heater output level. The heater ON_DUTY is an ON time for which the battery 10 supplies electricity to the heater 2 in the PWM control of the electric energy to the heater 2. The actual process of the PWM control is performed in the timer interrupt process by using the set heater ON_DUTY.

In the indicator output process, the CPU 13 sets the execution of a lighting pattern control for the voltage drop detection if the battery voltage drop condition is detected in the battery voltage detecting process. In the lighting pattern control for the voltage drop detection, the CPU 13 controls the LED 4 to be dimmed. An actual control for dimming the LED 4 is performed in the timer interrupt process. If a switch failure condition is detected in the switch input process, the CPU 13 outputs a command signal to the LED output I/F 21 to perform the lighting pattern control for the switch failure detection. In the lighting pattern control for the switch failure detection, the CPU 13 controls the LED 4 to be turned on or off (blink) at predetermined intervals. At this moment, it sets an LED-on time and an LED-off time in such a way that the LED-off time of the LED 4 is relatively longer than the LED-on time. In addition, it outputs a command signal to the LED output I/F 21 according to a heater output level set in the heater output process to blink the LED 4 in a blinking cycle according to the heater output level.

The timer interrupt process occurs, for example, every 100 microseconds. During execution of the timer interrupt process, the main control process is temporarily interrupted. In the timer interrupt process, a count value is set for a time counter for measuring the time based on input from the clock generating section 14. The timer interrupt process includes a determination of the execution timing for a process executed repeatedly in the main control process, a PWM control of the heater 2, a control of dimming the LED 4 at the time of detection of the battery voltage drop condition, and count value setting for measuring the ACG cycle.

The ACG input interrupt process occurs at a timing of a falling edge of a pulse signal input from the ACG signal input I/F 19 (occurs every falling edge of the pulse signal). In other words, the ACG input interrupt process occurs in synchronization with a pickup signal. The port of the CPU 13 connected to the ACG signal input I/F 19 has a higher priority than the timer interrupt process. During execution of the ACG interrupt process, both of the main control process and the timer interrupt process are temporarily interrupted.

In the ACG input interrupt process, the count value set in the timer interrupt process is read every time the interrupt process occurs, the ACG cycle is calculated, and then an ACG limiting level and a level of the upper limit electric energy to the heater 2 are determined based on the calculated ACG cycle and a predetermined threshold. The ACG limiting level indicates the number of revolutions of the generator 9 (or the engine) in stages and is set in three stages of level 0 to level 2 in this embodiment. The ACG limiting level is smaller in proportion as the number of revolutions is lower (If the ACG limiting level is zero, the upper limit electric energy level is set to level 5, the limitation of the electric energy to the heater 2 based on the upper limit electric energy is removed. If the ACG limiting level is 1, the upper limit electric energy level is set to level 2. If the ACG limiting level is 2, the upper limit electric energy level is set to level 1).

The following describes a detailed operation of the system according to this embodiment with reference to the flowcharts shown in FIG. 5 to FIG. 12. Referring to FIG. 5, FIG. 6, FIG. 7, FIG. 8, FIG. 9, FIG. 10, FIG. 11, and FIG. 12, there are shown a flowchart showing a main control process, a flowchart showing an initialization process, a flowchart showing a battery voltage detecting process, a flowchart showing a switch input process, a flowchart showing a heater output process, a flowchart showing an indicator output process, a flowchart showing a timer interrupt process, and a flowchart showing an ACG input interrupt process, respectively.

Figure 5:
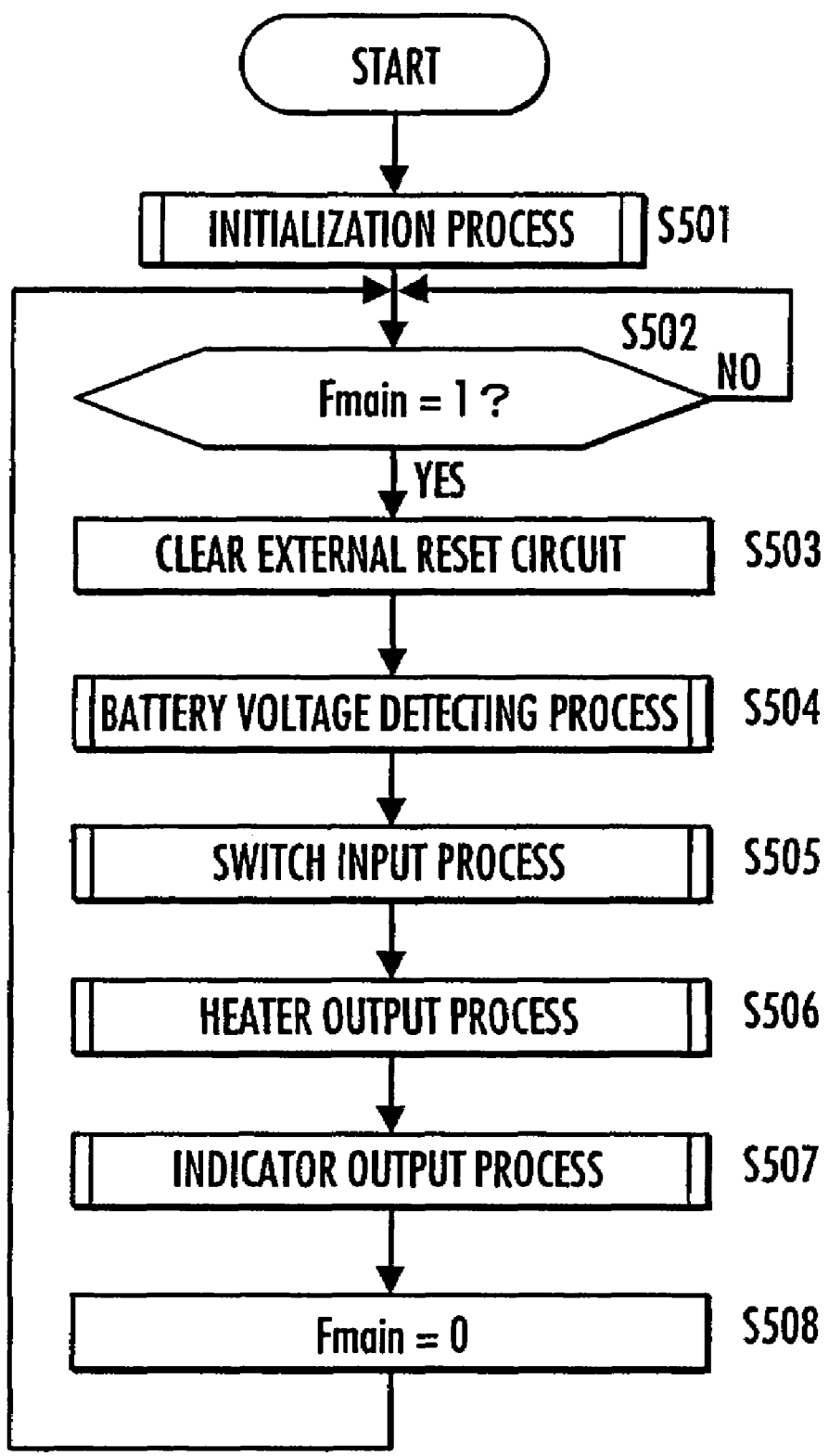
FIG. 5 is a flowchart showing a control operation of the grip heater control apparatus in FIG. 2.
Figure 6:
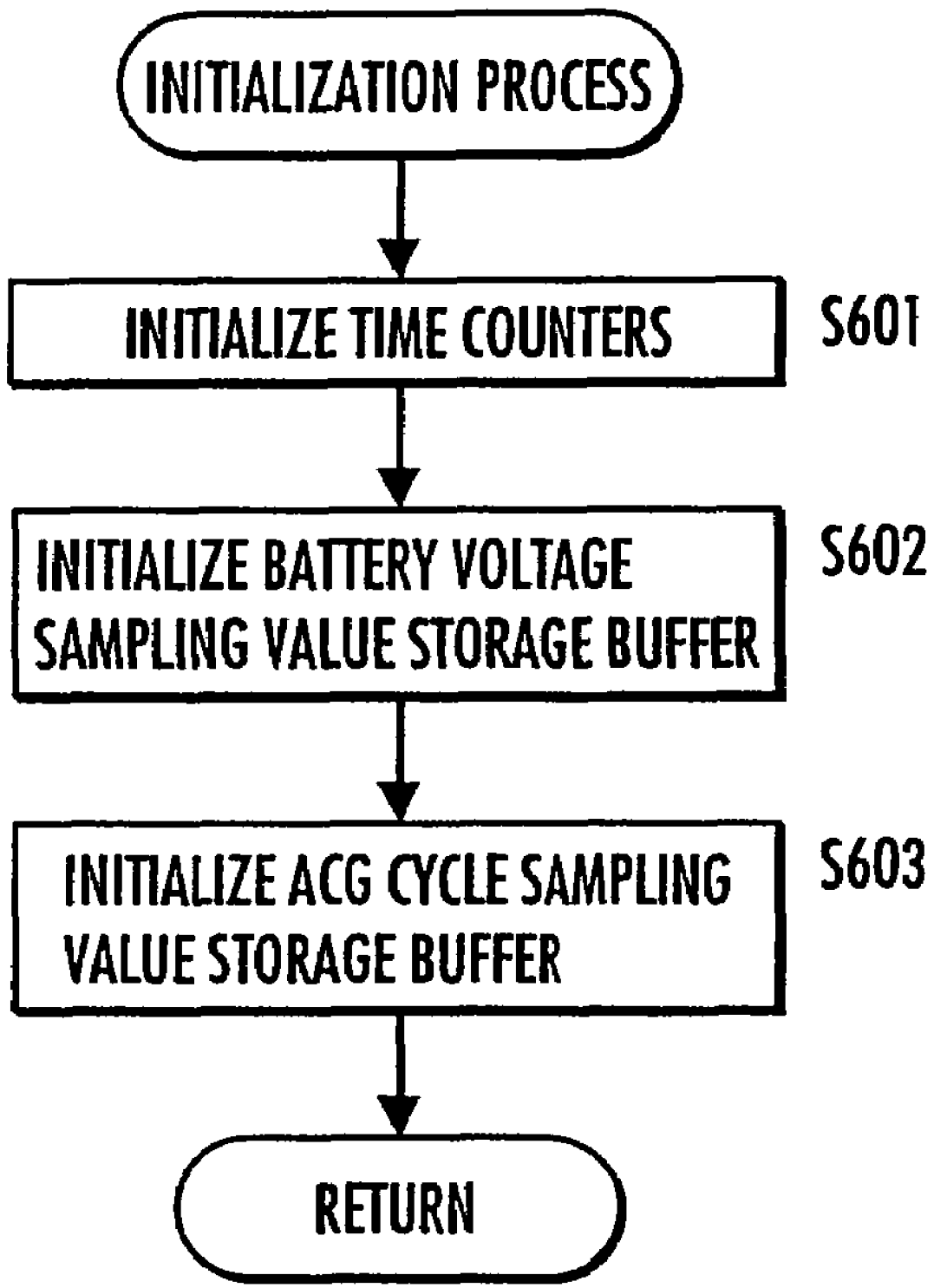
FIG. 6 is a flowchart showing a control operation of the grip heater control apparatus in FIG. 2.

Referring to FIG. 5, the initialization process is performed, first, upon starting the operation of the grip heater control apparatus 7 (when the main switch of the motorcycle is turned on and the battery 10 supplies the battery voltage to the controller 8) (step S501). The initialization process is executed as shown in FIG. 6. First, in step S601, time counters are initialized (each count value is set to 0). There are four types of time counters: a main cycle counter, a heater PWM counter, an LED cycle counter, and an ACG cycle counter. The four time counters are for use in the timer interrupt process (the timer interrupt process is described later).

Subsequently, a storage buffer for storing sampling values of battery voltages in time series order (a battery voltage sampling value storage buffer) is initialized (step S602). Then, a storage buffer for storing sampling values of ACG cycles in time series order (an ACG cycle sampling value storage buffer) is initialized (step S603). Eight pieces of data are stored in each of the battery voltage sampling value storage buffer and the ACG cycle sampling value storage buffer.

Subsequently, returning to FIG. 5, it is checked whether the main control cycle elapsed flag Fmain is 1 in step S502. The main control cycle elapsed flag Fmain is set to 0 as an initial value and set to 1 every time a predetermined control cycle (for example, 10 msec) is elapsed as a result of the timer interrupt process. Step S502 is repeated until the main control cycle elapsed flag Fmain is set to 1. If the main control cycle elapsed flag Fmain is set to 1, the process proceeds to step S503. In this step, a clear signal is output to the external reset circuit 15 (clearing the external reset circuit). The control then progresses to step S504 to perform the battery voltage detecting process.

Figure 7:
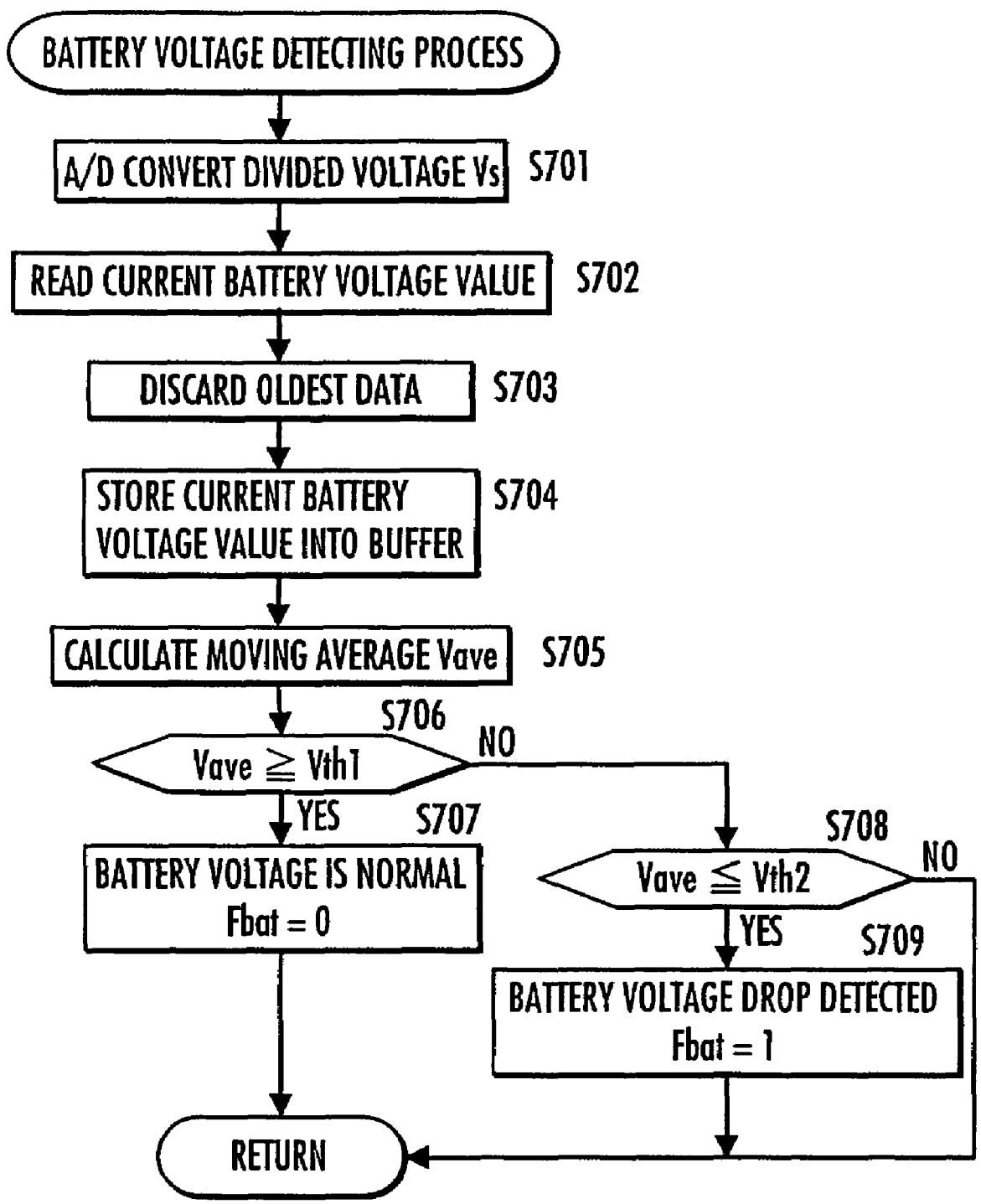
FIG. 7 is a flowchart showing a control operation of the grip heater control apparatus in FIG. 2.

The battery voltage detecting process is executed as shown in FIG. 7. First, a divided voltage Vs is input from the power supply voltage dividing section 18 and then a command is sent to perform an A/D conversion to an A/D converter circuit integrally incorporated into the CPU 13 (step S701). Thereby, the divided voltage Vs is A/D converted. Subsequently, the current converted Vs (in the current control cycle) is read as a voltage having the current battery voltage value (step S702). Alternatively, an actual battery voltage value may be calculated by multiplying Vs by a predetermined proportionality factor. Then, the oldest data in the battery voltage sampling value storage buffer is discarded (step S703) and the current battery voltage value is stored in the battery voltage sampling value storage buffer (step S704). A moving average Vave is then calculated from the stored data (step S705).

Subsequently, in step S706, the moving average Vave is compared with a battery voltage normality determination value Vth1, which is a threshold for determining that the battery voltage is normal (the battery voltage drop condition is not detected). If Vave is equal to or higher than Vth1, the battery voltage is determined to be normal and a voltage drop detection flag Fbat is set to 0 (step S707), and the process returns to step S504 shown in FIG. 5. The voltage drop detection flag Fbat is for use in indicating whether the battery voltage drops. It is set to 1 if the battery voltage drop condition is detected and set to 0 if the battery voltage is normal. If Vave is lower than Vth1 in step S706, the process proceeds to step S708 and Vave is compared with a battery voltage drop determining value Vth2, which is a threshold for determining that the battery voltage drops. The battery voltage drop determining value is lower than Vth1 and is set to a voltage slightly higher than the minimum voltage required to start the engine (to drive the starter motor). If Vave is equal to or lower than Vth2, the battery voltage is determined to drop and the voltage drop detection flag is set to 1 (step S709), and then the process returns to step S504 shown in FIG. 5. If Vave is higher than Vth2, the voltage drop detection flag Fbat is not updated, and the process returns to step S504 shown in FIG. 5.

It is assumed that the battery voltage normality determination value Vth1 is 12.5V and the battery voltage drop determining value Vth2 is 12.0V, for example. By setting Vth1 and Vth2 to different values in this manner and performing processes in steps S706 to S709, hysteresis characteristics are imparted to a variation in the determination of the battery voltage (an Fbat value) relative to a fluctuation of the battery voltage. Therefore, it is possible to prevent a situation where the determination frequently changes between the normal condition and the drop condition of the battery voltage around the threshold due to the fluctuation of the battery voltage. In this regard, Vth1 and Vth2 are determined in consideration of effects of noise and the like generated by a voltage drop of a circuit or a load of driving other devices.

Figure 8:
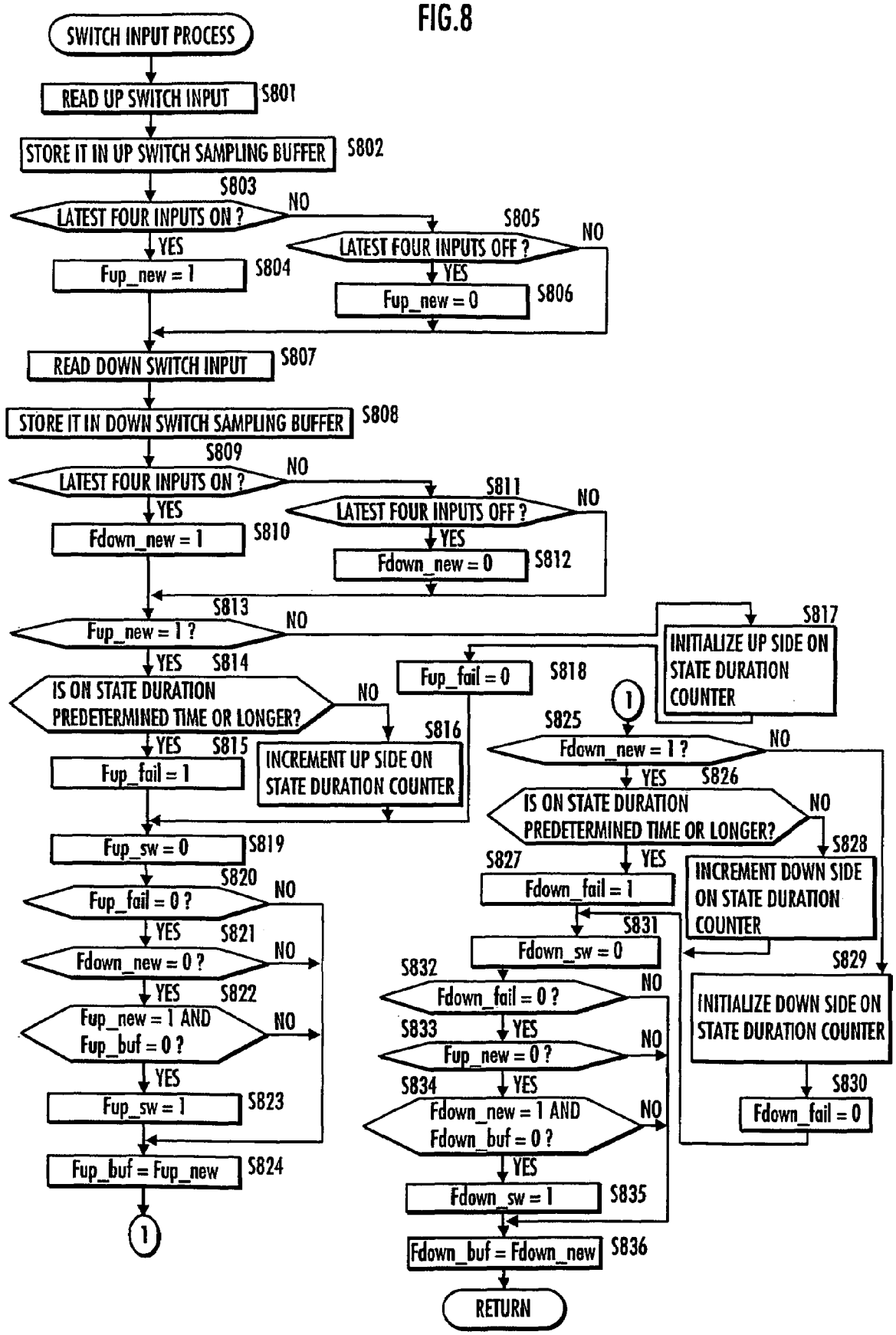
FIG. 8 is a flowchart showing a control operation of the grip heater control apparatus in FIG. 2.

Referring to FIG. 5 again, the switch input process is performed, next (step S505). The switch input process is executed as shown in FIG. 8. First, a signal input from the up switch input I/F 22 (an up switch input) is read (step S801) and the read up switch input is stored into an up switch sampling buffer (step S802). The up switch sampling buffer is for use in storing up switch inputs in time series order.

Next, in step S803, it is determined whether the latest four up switch inputs stored are ON inputs. If YES is determined in step S803, an up switch ON flag Fup_new is set to 1 (step S804) and the process proceeds to step S807. The up switch ON flag Fup_new is a flag indicating whether the up switch 5 is put in the ON state (the state in which the ON input is continuously input from the up switch input I/F 22) or in the OFF state (the state in which the OFF input is continuously input from the up switch input I/F 22). The up switch ON flag Fup_new is set to 1 if the up switch 5 is in the ON state and is set to 0 if it is in the OFF state. If NO is determined in step S803, it is determined whether the latest four inputs stored are OFF inputs (step S805). If YES is determined, the up switch ON flag Fup_new is set to 0 (step S806) and the process proceeds to step S807. If NO is determined in step S805, the up switch ON flag Fup_new does not change and the process proceeds to step S807. Thereby, only if ON inputs have been input in succession from the up switch input I/F 22 for four periods of the control cycle, the up switch 5 is determined to be pressed (the up switch 5 is put in the ON state). Meanwhile, only if OFF inputs have been input in succession from the up switch input I/F 22 for four periods of the control cycle, the up switch 5 is determined to be not pressed (the up switch 5 is put in the OFF state).

In step S807, a signal input from the down switch input I/F 23 (a down switch input) is read and the read down switch input is stored into a down switch sampling buffer (step S808) similarly to the up switch 5. The down switch sampling buffer is for use in storing down switch inputs in time series order.

Next, in step S809, it is determined whether the latest four down switch inputs stored are ON inputs. If YES is determined in step S809, a down switch ON flag Fdown_new is set to 1 (step S810) and the process proceeds to step S813. The down switch ON flag Fdown_new indicates whether the down switch 6 is put in the ON state (the state in which the ON input is continuously input from the down switch input I/F 23) or in the OFF state (the state in which the OFF input is continuously input from the down switch input I/F 23). The down switch ON flag Fdown_new is set to 1 if the down switch 6 is in the ON state and is set to 0 if it is in the OFF state. If NO is determined in step S809, it is determined whether the latest four inputs stored are OFF inputs (step S811). If YES is determined, the down switch ON flag Fdown_new is set to 0 (step S812) and the process proceeds to step S813. If NO is determined in step S811, the down switch ON flag Fdown_new does not change and the process proceeds to step S813. Thereby, only if ON inputs have been input in succession from the down switch input I/F 23 for four periods of the control cycle, the down switch 6 is determined to be pressed (the down switch 6 is put in the ON state). Meanwhile, only if OFF inputs have been input in succession from the down switch input I/F 23 for four periods of the control cycle, the down switch 6 is determined to be not pressed (the down switch 6 is put in the OFF state).

The next process is to determine whether the up switch 5 is out of order. First, it is checked that the up switch ON flag Fup_new is set to 1 (step S813). If the up switch ON flag Fup_new is set to 0, an up side ON state duration counter is initialized (step S817), an up switch failure detection flag Fup_fail is set to 0 (step S818), and the process proceeds to step S819. The up side ON state duration counter is for use in measuring the time period during which the ON state of the up switch 5 continues. The up switch failure detection flag Fup_fail is for use in indicating that the up switch 5 is out of order. The up switch failure detection flag Fup_fail is set to 1 if the up switch 5 is determined to be out of order and is set to 0 unless the up switch 5 is determined to be out of order.

If the up switch ON flag Fup_new is set to 1 in step S813, the duration of the ON state is equal to or longer than a predetermined time period (step S814). The predetermined time period is, for example, 10 sec. If YES is determined in step S814, the up switch 5 is determined to be out of order and Fup_fail is set to 1 (step S815). If NO is determined in step S814, the up side ON state duration counter is incremented by 1 (step S816). Thereby, abnormality of the up switch 5 can be detected when a circuit related to the up switch 5 is short-circuited or when the up switch 5 is held down unintentionally by the driver, whereby it is possible to prevent erroneous determination that the up switch 5 is pressed.

Subsequently, it is determined whether the up switch 5 is pressed (whether it is intended to change the OFF state to the ON state). This process causes the value of an up switch operation detection flag Fup_sw to be set. The up switch operation detection flag Fup_sw is for use in indicating whether the up switch 5 is pressed. The up switch operation detection flag Fup_sw is set to 1 if the up switch 5 is determined to be pressed and set to 0 unless it is determined to be pressed.

First, in step S819, the up switch operation detection flag Fup_sw is set to 0. Subsequently, in step S820, it is checked whether the up switch failure detection flag Fup_fail is set to 0. If a failure is detected in the up switch 5 (Fup_fail=1), the process proceeds to step S824. If no failure is detected in the up switch 5 (Fup_fail=0), the process proceeds to step S821 and the down switch ON flag Fdown_new is checked. If the down switch 6 is pressed (Fdown_new=1), the process proceeds to step S824. Thus, if the up switch 5 and the down switch 6 are both pressed at a time, the operations of the switches 5, 6 become invalid.

Unless the down switch 6 is pressed (Fdown_new=0) in step S821, the process proceeds to step S822 and it is confirmed that the up switch 5 is pressed in the current control cycle and that an up switch previous state flag Fup_buf is set to 0. The up switch previous state flag Fup_buf is for use in storing a value of the up switch ON flag Fup_new in the switch input process in the previous control cycle. If YES is determined in step S822, the up switch 5 is determined to be pressed and the up switch operation detection flag Fup_sw is set to 1 (step S823). Thereby, the up switch operation detection flag Fup_sw is set to 1 only if the up switch 5 is determined to be normal (the state in which Fup_fail is set to 0) and it is determined to be pressed from the condition where it is not pressed (when the up switch ON flag Fup_new is switched from 0 to 1). Next, in step S824, the up switch previous state flag Fup_buf is set to the current value of the up switch ON flag Fup_new.

Subsequently, in steps S825 to S830, it is determined whether the down switch 6 is out of order similarly to the up switch 5. First, it is checked that the down switch ON flag Fdown_new is set to 1 (step S825). If the down switch ON flag Fdown_new is set to 0, a down side ON state duration counter is initialized (step S829), a down switch failure detection flag Fdown_fail is set to 0 (step S830), and the process proceeds to step S831. The down side ON state duration counter is for use in measuring the time period during which the ON state of the down switch 6 continues. The down switch failure detection flag Fdown_fail is for use in indicating that the down switch 6 is out of order. The down switch failure detection flag Fdown_fail is set to 1 if the down switch 6 is determined to be out of order and is set to 0 unless the down switch 6 is determined to be out of order.

If the down switch ON flag Fdown_new is set to 1 in step S825, the duration of the ON state is equal to or longer than a predetermined time period (step S826). The predetermined time period is, for example, 10 sec. If YES is determined in step S827, the down switch 6 is determined to be out of order and Fdown_fail is set to 1 (step S827). If NO is determined in step S826, the down side ON state duration counter is incremented by 1 (step S828). Thereby, abnormality of the down switch 6 can be detected when a circuit related to the down switch 6 is short-circuited or when the down switch 6 is held down unintentionally by the driver, whereby it is possible to prevent erroneous determination that the down switch 6 is pressed.

Subsequently, it is determined whether the down switch 6 is pressed. This process causes the value of a down switch operation detection flag Fdown_sw to be set. The down switch operation detection flag Fdown_sw is for use in indicating whether the down switch 6 is pressed. The down switch operation detection flag Fdown_sw is set to 1 if the down switch 6 is determined to be pressed and set to 0 unless it is determined to be pressed.

First, in step S831, the down switch operation detection flag Fdown_sw is set to 0. Subsequently, in step S832, it is checked whether the down switch failure detection flag Fdown_fail is set to 0. If a failure is detected in the down switch 6 (Fdown_fail=1), the process proceeds to step S836. If no failure is detected in the down switch 6 (Fdown_fail=0), the process proceeds to step S833 and the up switch ON flag Fup_new is checked. If the up switch 5 is pressed (Fup_new=1), the process proceeds to step S836. Thus, if the up switch 5 and the down switch 6 are both pressed at a time, the operations of the switches 5, 6 become invalid.

Unless the up switch 5 is pressed (Fup_new=0) in step S833, the process proceeds to step S834 and it is confirmed that the down switch 6 is pressed and that a down switch previous state flag Fdown_buf is set to 0. The down switch previous state flag Fdown_buf is for use in storing a value of the down switch ON flag Fdown_new in the switch input process in the previous control cycle. If YES is determined in step S834, the down switch 6 is determined to be pressed and the down switch operation detection flag Fdown_sw is set to 1 (step S835). Thereby, the down switch operation detection flag Fdown_sw is set to 1 only if the down switch 6 is determined to be normal (the state in which Fdown_fail is set to 0) and then it is determined to be pressed from the condition where it is not pressed (when the down switch ON flag Fdown_new is switched from 0 to 1). Next, in step S836, the down switch previous state flag Fdown_buf is set to the current value of the down switch ON flag Fdown_new.

Figure 9:
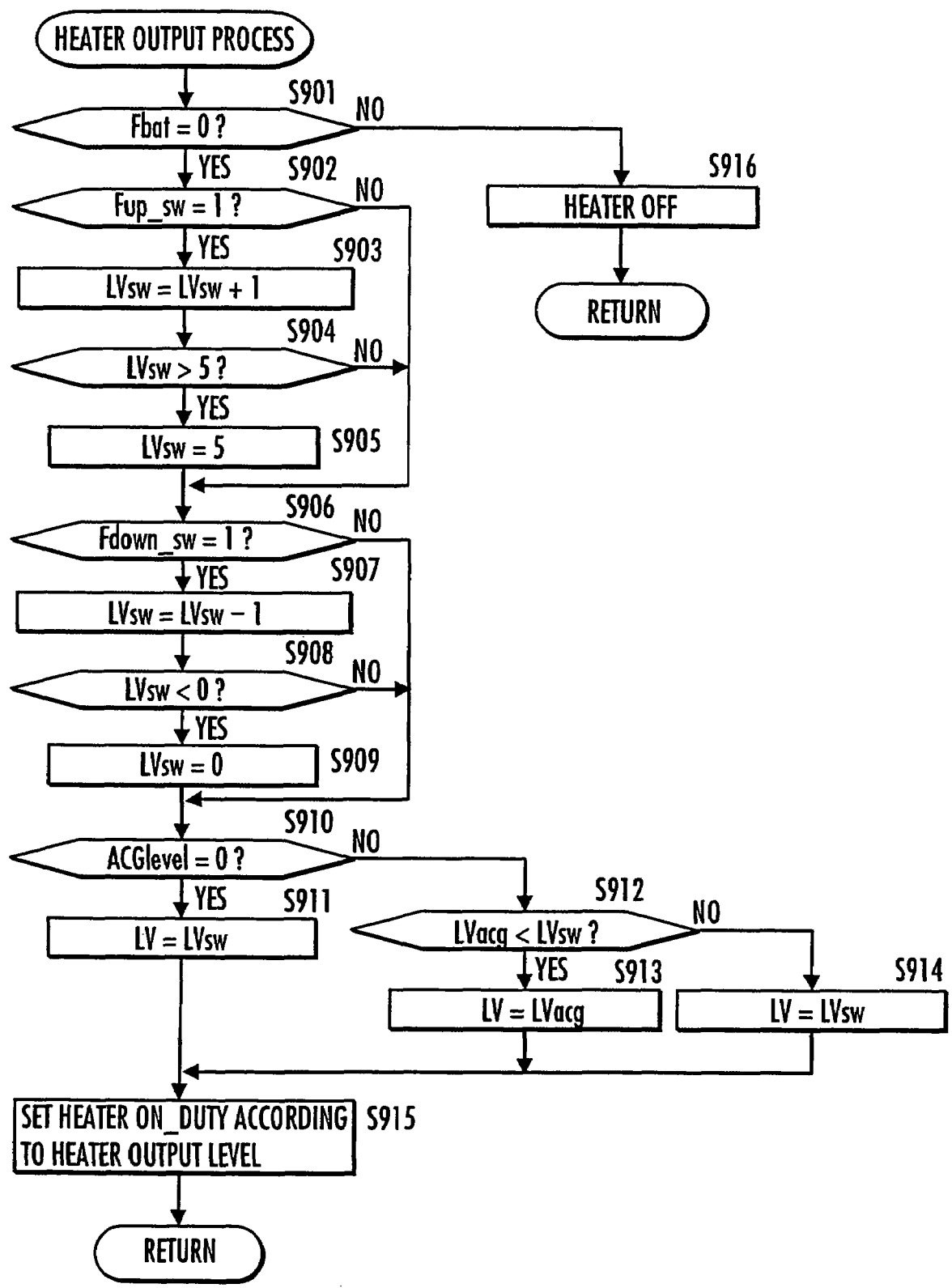
FIG. 9 is a flowchart showing a control operation of the grip heater control apparatus in FIG. 2.

Referring to FIG. 5 again, the heater output process is performed, next (step S506). The heater output process is executed as shown in FIG. 9. First, in step S901, is checked a voltage drop detection flag Fbat set in the battery voltage detecting process. If the battery voltage drop condition is detected (Fbat=1), the process proceeds to step S916, in which a command signal is output to the heater output I/F 20 to turn off the heater 2, and then the process proceeds to step S506 in FIG. 5. Thereby, if the battery voltage drops, the heater 2 is forcibly turned off so as to prevent the battery voltage from decreasing excessively.

If the battery voltage is normal (Fbat=0), a level LVsw of the target electric energy to the heater 2 is set based on the pressing of the switches 5, 6. First, LVsw is set for the pressing of the up switch 5. There is checked up switch operation detection flag Fup_sw, which has been set in the switch input process (step S902). Unless the pressing of the up switch 5 is detected (Fup_sw=0), the process proceeds to step S906. If the pressing of the up switch 5 is detected (Fup_sw=1), the process proceeds to step S903 and LVsw is incremented by 1. Subsequently, it is checked that LVsw is higher than 5 (step S904). If LVsw is equal to or lower than 5, the process proceeds to step S906. If LVsw is higher than 5, LVsw is set to 5 (step S905) and then the process proceeds to step S906.

Subsequently, LVsw is set for the pressing of the down switch 6 similarly to the pressing of the up switch 5. First, there is checked the down switch operation detection flag Fdown_sw, which has been set in the switch input process (step S906). Unless the pressing of the down switch 6 is detected (Fdown_sw=0), the process proceeds to step S910. If the pressing of the down switch 6 is detected (Fdown_sw=1), the process proceeds to step S907 and LVsw is decremented by 1. Subsequently, it is checked that LVsw is lower than 0 (step S908). If LVsw is equal to or higher than 0, the process proceeds to step S910. If LVsw is lower than 0, LVsw is set to 0 (step S909) and then the process proceeds to step S910. Through the processes to step S909 described hereinabove, LVsw is set in stages of 0 to 5 according to the pressing of the switches 5, 6.

Subsequently, the target electric energy level LVsw set based on the pressing of the switches 5, 6 is compared with the upper limit electric energy level LVacg set based on the ACG cycle and a lower level is set as a heater output level LV. First, in step S910, the ACG limiting level ACGlevel set in the ACG input interrupt process is checked (the ACG input interrupt process is described later). If the ACG level is set to 0 (if the number of revolutions of the generator 9 is sufficiently high), the process proceeds to step S911 and the heater output level LV is set to LVsw.

Unless ACGlevel is set to 0 (if the number of revolutions of the generator 9 is low), the process proceeds to step S912 and LVacg is compared with LVsw. If LVacg is lower than LVsw, the heater output level LV is set to LVacg (step S913). If LVacg is equal to or higher than LVsw, the heater output level LV is set to LVsw (step S914). Thereby, if LVacg (the upper limit electric energy) is equal to or higher than LVsw (the target electric energy), the heater output level LV, namely, the electric energy actually supplied to the heater 2 is controlled to the target electric energy, whereby the heater 2 can be controlled to a temperature meeting the driver's request. Moreover, if LVacg (the upper limit electric energy) is lower than LVsw (the target electric energy), the heater output level LV (the electric energy actually supplied to the heater 2) is controlled to the upper limit electric energy, thereby enabling the heater 2 to warm the grip 1 while suppressing the voltage drop of the battery 10.

Next, in step S915, the heater ON_DUTY in the PWM control of the heater 2 is set according to the set heater output level LV. The heater ON_DUTY is set to 0 if LV is 0. It is set higher in proportion as LV increases. The PWM control of the heater 2 is performed in the timer interrupt process on the basis of the heater ON_DUTY set in this process (the timer interrupt process is described later).

Figure 10:
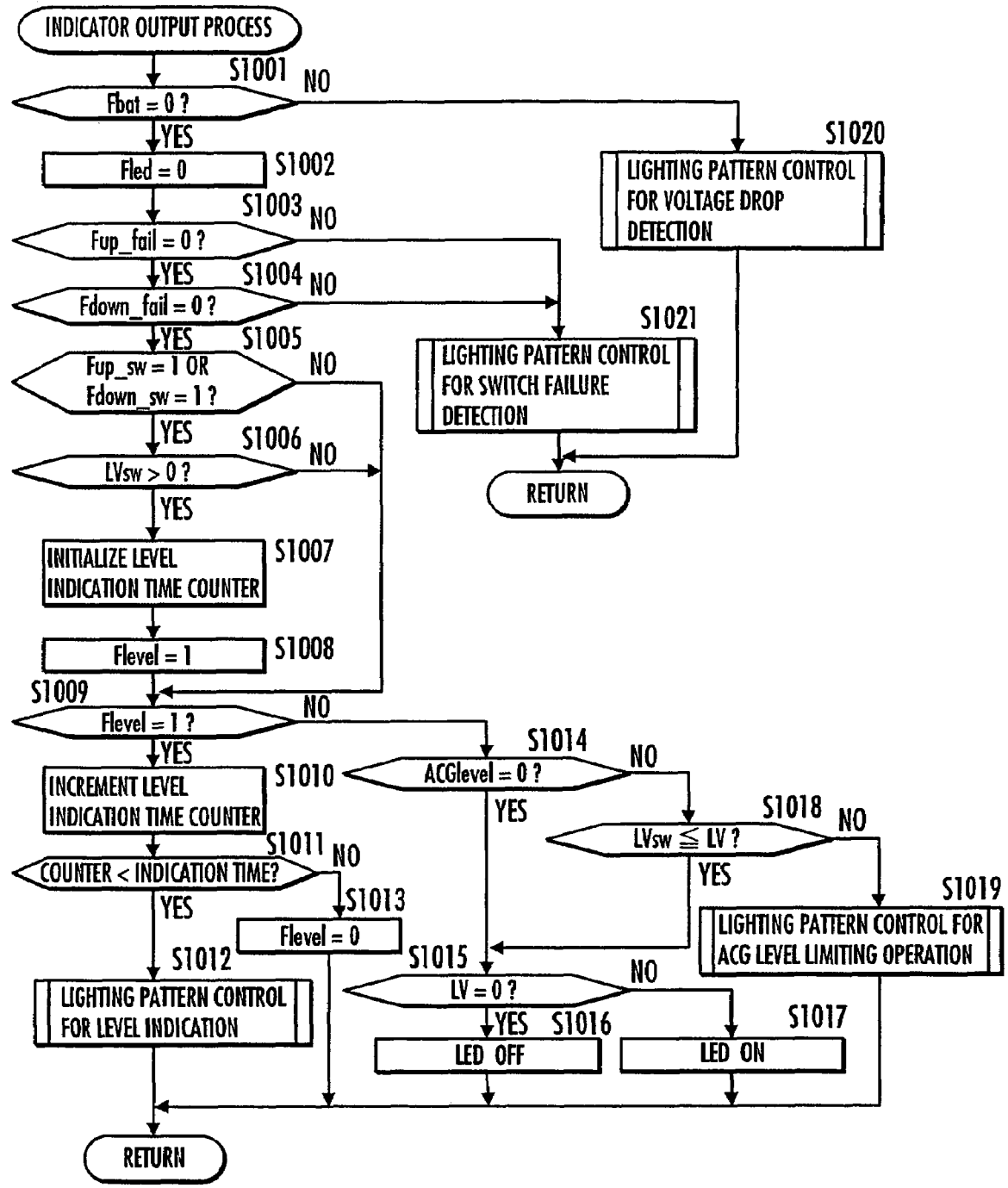
FIG. 10 is a flowchart showing a control operation of the grip heater control apparatus in FIG. 2.

Then, returning to FIG. 5, the process proceeds to the indicator output process (step S507). The indicator output process is executed as shown in FIG. 10. First, in step S1001, there is checked the voltage drop detection flag Fbat, which has been set in the battery voltage detecting process. If the battery voltage drop condition is detected (Fbat=1), the process proceeds to step S1020, the LED dimming flag Fled is set to 1 to perform the lighting pattern control for the voltage drop detection and then the process returns to step S507 in FIG. 5. The LED dimming flag Fled is for use in indicating whether to perform the lighting pattern control for the voltage drop detection. If the battery voltage drop condition is detected, the LED dimming flag Fled is set to 1. Otherwise, it is set to 0. The actual lighting patter control for the voltage drop detection (the dimming indication of the LED 4) is performed in the timer interrupt process (the timer interrupt process is described later).

If the battery voltage is normal (Fbat=0), the process proceeds to step S1002 and the LED dimming flag Fled is set to 0. A switch failure condition is then checked. First, is checked the up switch failure detection flag Fup_fail, which has been set in the switch input process (step S1003). If the failure of the up switch 5 is detected (Fup_fail=1), the process proceeds to step S1021. Unless the failure of the up switch 5 is detected (Fup_fail=0), the process proceeds to step S1004 to check the down switch failure detection flag Fdown_fail. If the down switch 6 is detected (Fdown_fail=1), the process proceeds to step S1021.

In step S1021, the lighting pattern control for the switch failure detection is performed and then the process returns to step S507 in FIG. 5. In this pattern control, for example, the LED 4 is controlled to light up for 0.1 sec in a 5-sec cycle. This causes a long-cycle indication different from other electrified condition, by which the driver can recognize the switch failure clearly.

Unless the failure of the switch 6 is detected in step S1004, the process proceeds to step S1005 to check the up switch operation detection flag Fup_sw and the down switch operation detection flag Fdown_sw set in the switch input process. Unless the pressing of both the switches 5, 6 is detected (Fup_sw=0 and Fdown_sw=0), the process proceeds to step S1009. If the pressing of the switches 5, 6 is detected (Fup_sw=1 or Fdown_sw=1), the process proceeds to step S1006 to determine whether LVsw is higher than 0. If LVsw is higher than 0, a level indication time counter is initialized (step S1007), a level change indication flag Flevel is set to 1 (step S1008), and the process proceeds to step S1009. The level indication time counter is for use in measuring the time duration of the lighting pattern control for the level indication corresponding to the heater output level LV. The level change indication flag Flevel is for use in indicating whether the lighting pattern control for the level indication is to be performed, with its initial value set to 0. It is set to 1 if the heater output level LV is changed and set to 0 after the expiration of a predetermined indication time interval since it is set to 1. The predetermined indication time is, for example, 10 sec. If LVsw is equal to or lower than 0 in step S1006, the process proceeds directly to step S1009.

In step S1009, it is checked whether the level change indication flag Flevel is 1. If it is 1, the level indication time counter is incremented by 1 (step S1010). Then, the count value of the level indication time counter is compared with a predetermined indication time (step S1011). If the level indication time counter is lower than the predetermined indication time in step S1011, the process proceeds to step S1012 to perform the lighting pattern control for the level indication and then the process returns to step S507 in FIG. 5. If the level indication time counter is equal to or higher than the predetermined indication time in step S1011, the level change indication flag Flevel is set to 0 (step S1013) and then the process returns to step S507.

In the lighting pattern control for the level indication in step S1012, the LED 4 is caused to blink in a predetermined cycle. This blinking is continued for a period of the predetermined indication time (for example, 10 sec) immediately after the detection of the pressing of the switches 5, 6 thereafter. This enables the driver to be easily aware of the multi-stage electrified condition of the heater 2 by means of blinking of the LED 4. In this regard, the predetermined cycle for blinking the LED 4 is set in such a way as to be shorter in proportion as the heater output level LV increases. For example, the LED 4 is caused to blink in a 2-sec cycle if LV is level 1 and to blink in a 1.25-sec cycle if LV is level 5. Thereby, the frequency of blinking the LED is higher (the cycle is shorter) in proportion as the electric energy to the heater 2 increases according to the magnitude of the change in the electric energy to the heater 2. Therefore, the driver can readily get a sense of the electric energy to the heater 2 and thus the driver can recognize the electrified condition of the heater 2 more easily.

If the level change indication flag Flevel is set to 0 in step S1009, the process proceeds to step S1014 to check whether ACG level is set to 0. If ACGlevel is set to 0 (if the number of revolutions of the generator 9 is sufficiently high), the process proceeds to step S1015. Unless ACGlevel is se to 0 (if the number of revolutions of the generator 9 is low) in step S1014, the process proceeds to step S1018 to compare LVsw with LV. If LVsw is equal to or lower than LV, the electric energy to the heater 2 is controlled to the target electric energy. If so, the process proceeds to step S1015.

In step S1015, it is checked whether the heater output level LV is set to 0. If LV is set to 0, the process proceeds to step S1016 to turn off the LED 4 and then the process returns to step S507 in FIG. 5. Thereby, if the heater output level LV is level 0 (if the heater 2 is put in the OFF state), the LED 4 is turned off. Thus, the driver can clearly recognize that the heater 2 is stopped by the driver's operation.

Unless the heater output level LV is set to 0 in step S1015, the process proceeds to step S1017 to turn on the LED 4 and then the process returns to step S507 in FIG. 5. Thereby, after the expiration of a predetermined indication time interval (for example, 10 sec), the LED 4 continuously comes on if the heater 2 is controlled to the target electric energy set by the driver where there is no occurrence of the battery voltage drop condition, the switch failure condition, and the OFF state of the heater 2. Therefore, the driver can clearly recognize that the heater 2 is constantly supplied with the target electric energy set by the driver when the lighting pattern control for the level indication is not provided. If the battery voltage drop condition is detected after the expiration of the predetermined indication time interval, the LED 4 is dimmed by means of the lighting pattern control for the voltage drop detection. If the switch failure condition is detected, the LED 4 is turned on intermittently in a relatively slow cycle by means of the lighting pattern control for the switch failure detection.

Subsequently, if LVsw is higher than LV in step S1018, the electric energy to the heater 2 is controlled to the upper limit electric energy. If so, the process proceeds to step S1019 to perform a lighting pattern control for the ACG level limiting operation. In the lighting pattern control for the ACG level limiting operation in step S1019, the LED 4 is caused to blink continuously in a blinking cycle corresponding to the heater output level LV during the ACG level limiting operation (when LV is controlled to LVacg (<LVsw)). Thereby, the driver can clearly recognize that the ACG level limiting operation is under execution (the electric energy actually supplied to the heater 2 is limited to the upper limit electric energy).

Moreover, the process returns to step S507 in FIG. 5 to reset the main control cycle elapsed flag Fmain to 0 (step S508). Then, the process returns to step S502 to repeat the processing. Thereby, the processes of steps S503 to S508 are repeated in a predetermined control cycle.

Figure 11:
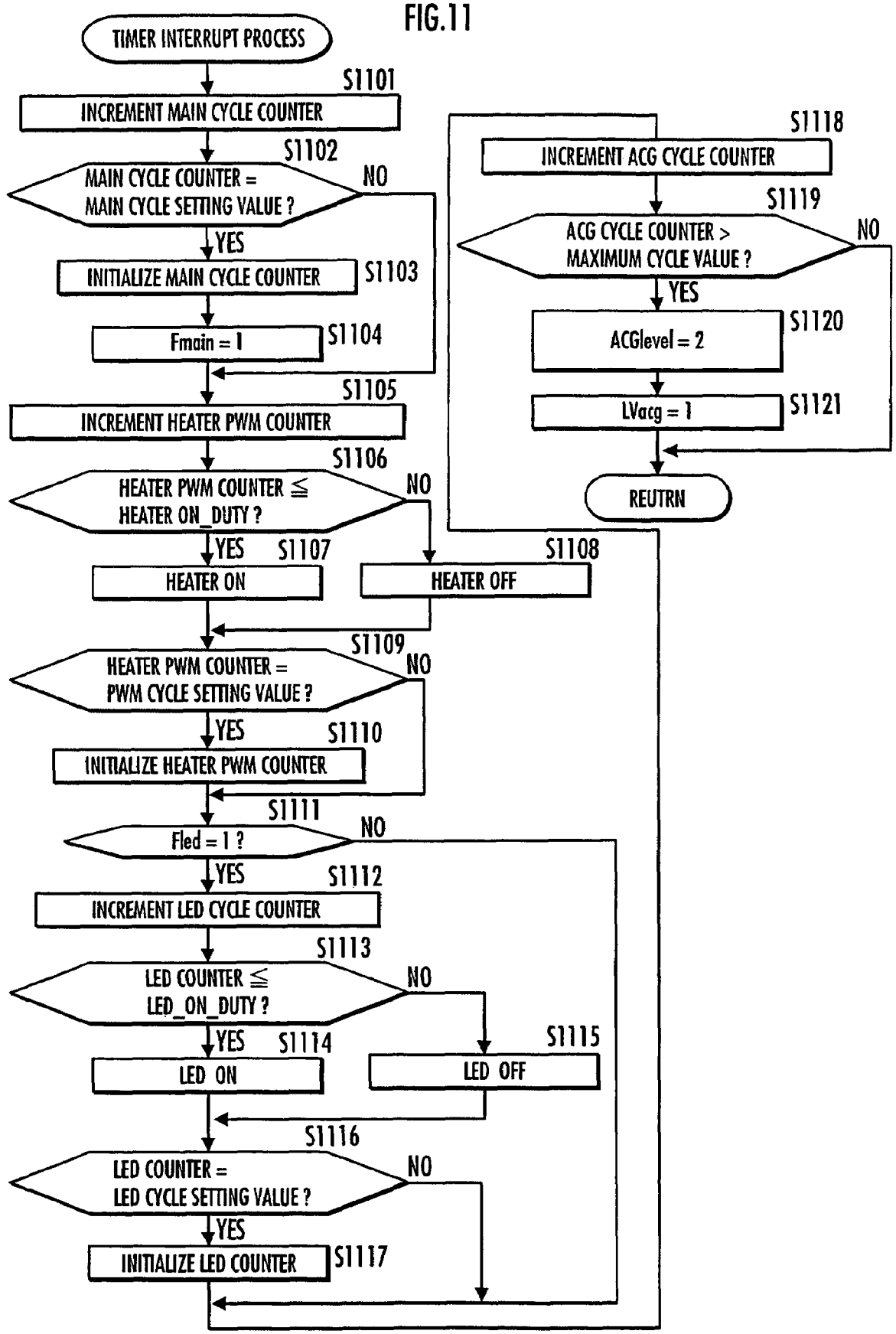
FIG. 11 is a flowchart showing a control operation of the grip heater control apparatus in FIG. 2.

The timer interrupt process is described below. Referring to FIG. 11, processing related to the main cycle counter is performed, first. The main cycle counter is for use in measuring the time for determining timings of executing the processes of steps S503 to S508 of the main control process. In step S1101, the main cycle counter is incremented by 1. Subsequently, it is checked whether the count value of the main cycle counter equals a main cycle setting value (step S1102). The main cycle setting value is the control cycle for performing the processes of steps S503 to S508 of the main control process. If YES is determined in step S1102, the main cycle counter is initialized (step S1103) and the main control cycle elapsed flag Fmain is set to 1 (step S1104). Then, the process proceeds to step S1105. If NO is determined in step S1102, the process proceeds directly to step S1105.

Subsequently, processing related to the heater PWM counter is performed. It is processing for performing the PWM control of the heater 2. In the PWM control of the heater 2, the electric energy to the heater 2 is adjusted by changing the ratio of the on time to the off time of the heater 2 during the PWM control cycle.

First, in step S1105, the heater PWM counter is incremented by 1. The heater PWM counter is for use in measuring the time for which the heater 2 is turned on and the time for which it is turned off in the PWM control of the heater 2. Then, it is checked whether the count value of the heater PWM counter is equal to or lower than the heater ON_DUTY (step S1106). If YES is determined, the heater 2 is turned on (step S1107). If NO is determined, the heater 2 is turned off (step S1108). Next, in step S1109, it is checked whether the heater PWM counter equals a PWM cycle setting value. The PWM cycle setting value is a predetermined value as a cycle for performing the PWM control of the heater 2. If YES is determined in step S1109, the heater PWM counter is initialized (step S1110) and then the process proceeds to step S1111. If NO is determined in step S1109, the process proceeds directly to step S1111.

Subsequently, processing related to the LED cycle counter is performed. It is processing for performing a dimming indication of the LED 4. The LED 4 is dimmed by controlling the ratio of the on time to the off time for energizing the LED 4 (the electric energy to the LED 4 is adjusted by the PWM control). First, in step S1111, it is checked whether the LED dimming flag Fled is 1. Unless it indicates the dimming condition (Fled=0), the process proceeds to step S1118.

If it indicates the dimming condition (Fled=1), the LED cycle counter is incremented by 1 (step S1112). The LED cycle counter is for use in measuring the time for which the LED 4 is turned on and the time for which it is turned off by means of the PWM control of the LED 4. Then, it is determined whether the count value on the LED cycle counter is equal to or lower than LED_ON_DUTY (the on time of the LED 4 within one cycle of the PWM control) (step S1113). The LED_ON_DUTY value is previously determined. If YES is determined in step S1113, an ON signal (high-voltage signal) is output to the LED output I/F 21 to turn on the LED 4 (step S1114). If NO is determined, an OFF signal (low-voltage signal) is output to the LED output I/F 21 to turn off the LED 4 (Step S1115). Next, in step S1116, it is checked whether the LED cycle counter is set at an LED cycle setting value. The LED cycle setting value is a value predetermined as a cycle for performing the PWM control of the LED 4. If YES is determined in step S1116, the LED cycle counter is initialized (step S1117) and then the process proceeds to step S1118. If NO is determined in step S1116, the process proceeds directly to step S1118.

Next, processing related to the ACG cycle counter is performed. The ACG cycle counter is for use in measuring the time for measurement of an ACG cycle indicating the number of revolutions of the generator 9 based on a pulse signal input from the ACG signal input I/F 19. First, in step S1118, the ACG cycle counter is incremented by 1. Then, it is determined whether the count value of the ACG cycle counter is higher than the maximum value of the ACG cycle (step S1119). The maximum value of the ACG cycle is predetermined to detect the state of the engine at standstill, for example. The value is sufficiently higher than the ACG cycle that can have during engine operation. If the count value of the ACG cycle counter is equal to or lower than the maximum value of the ACG cycle in step S1119, the timer interrupt process is terminated.

If the count value of the ACG cycle counter is higher than the maximum value of the ACG cycle in step S1119 (if the engine is at standstill), the ACG limiting level ACGlevel is set to 2 (step S1120), the level LVacg of the upper limit electric energy to the heater 2 is set to 1 (step S1121), and then the timer interrupt process is terminated. Thereby, if the ACG cycle value is higher than the maximum value of the ACG cycle (if the engine is at standstill), the level of the upper limit electric energy is set to level 1 (the lowest level), thereby preventing the battery voltage from excessively dropping by minimizing the electric energy supplied from the battery 10 to the heater 2 when the generator 9 is not generating power.

Figure 12:
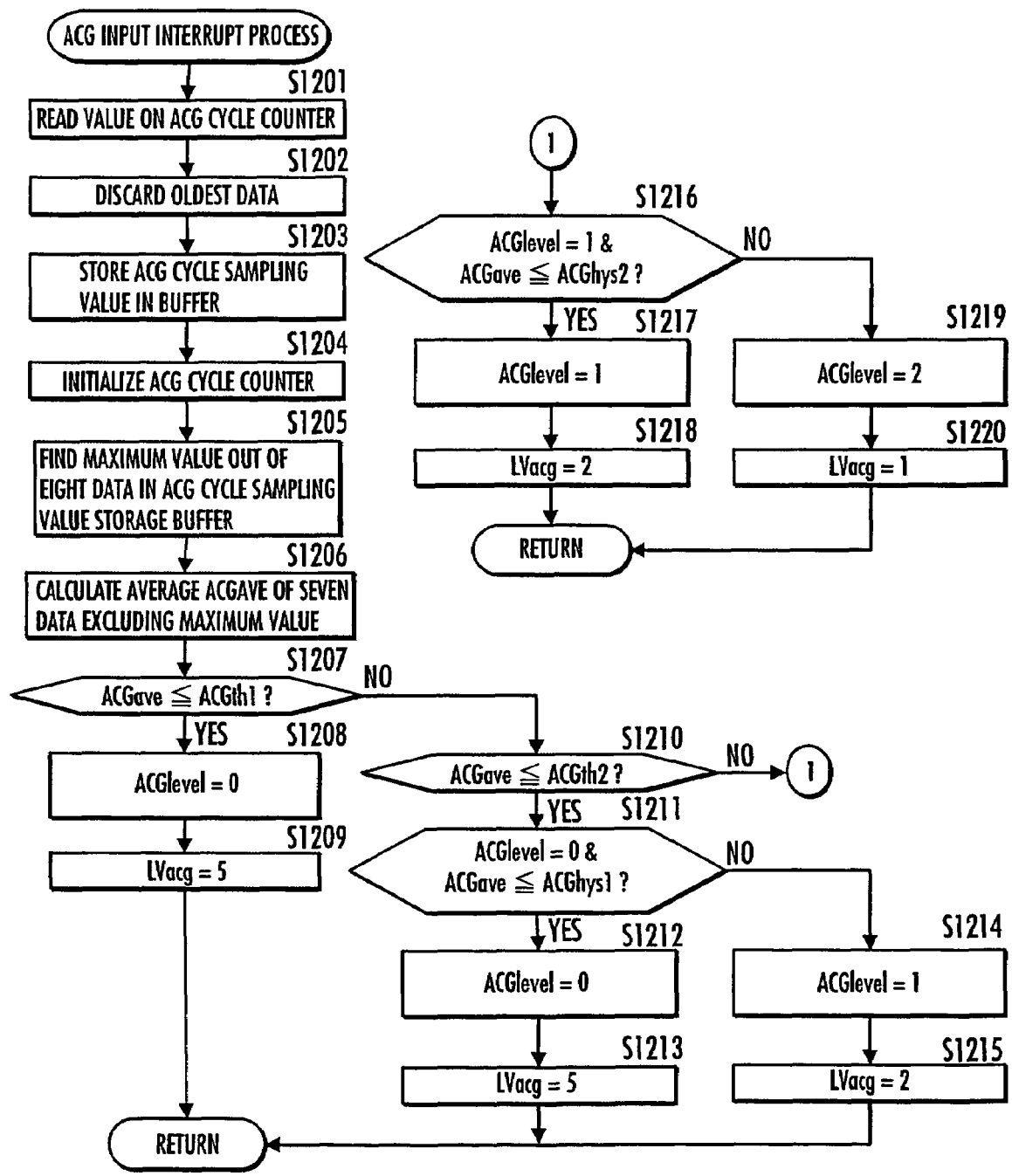
FIG. 12 is a flowchart showing a control operation of the grip heater control apparatus in FIG. 2.

Then, the following describes the ACG input interrupt process. Referring to FIG. 12, first, is read the count value on the ACG cycle counter set in the timer interrupt process (step S1201). Next, the oldest data is discarded from the ACG cycle sampling value storage buffer (step S1202) and the read count value is stored into the ACG cycle sampling value storage buffer (step S1203). Then, the ACG cycle counter is initialized (step S1204). Subsequently, the maximum value is detected out of eight pieces of data stored in the ACG cycle sampling value storage buffer (step S1205) and the ACG cycle ACGave is calculated by averaging seven pieces of data excluding the maximum value (step S1206). Thereby, even if the pickup signal partially includes a period during which there is no signal output, the ACG cycle can be calculated appropriately.

Subsequently, ACGave is compared with a threshold ACGth1 (step S1207). ACGth1 is a threshold for determining whether the ACG limiting level is level 0 or level 1 when the ACG cycle becomes shorter (when the number of revolutions of the generator 9 is increasing). If ACGave is equal to or lower than ACGth1 in step S1207, ACGlevel is set to 0 (step S1208), LVacg is set to 5 (step S1209), and then the ACG input interrupt process is terminated.

For example, assuming the ACGth1 is 0.03 sec. (when the number of engine revolutions is 2000 rpm), if the ACG cycle is equal to or shorter than 0.03 sec (the number of revolutions of the engine is equal to or higher than 2000 rpm), the upper limit electric energy to the heater is set to level 5 (the maximum level) and thus the limitation on the electric energy to the heater 2 is substantially removed. Therefore, the electric energy to the heater 2 is inevitably controlled to the target electric energy, and thus the electric energy to the heater 2 is not limited when the electric power generation of the generator 9 is sufficiently large relative to the electric energy required for the heater 2 due to the large number of revolutions. Thus, the electric energy to the heater 2 can be controlled in such a way as to bring the heater 2 to the temperature meeting the driver's request. Alternatively, if the ACG cycle is equal to or shorter than 0.03 sec, the electric energy to the heater 2 may be always controlled to the target electric energy without setting of the upper limit electric energy to the heater 2.

If ACGave is higher than ACGth1 in step S1207, the process proceeds to step S1210 to compare ACGave with a threshold value ACGth2. The ACGth2 is higher than ACGth1 and for use in determining whether the ACG limiting level is level 1 or level 2 when the ACG cycle is getting shorter. If ACGave is equal to or lower than ACGth2, the process proceeds to step S1211 to determine whether ACGlevel is set to 0 and ACGave is equal to or lower than a threshold value ACGhys1. The ACGhys1 is higher than ACGth1 and lower than ACGth2. It is for use in determining whether the ACG limiting level is level 0 or level 1 when the ACG cycle is getting longer (when the number of revolutions of the generator 9 is decreasing). ACGhys1 is assumed to be about 10% higher than ACGth1, for example. If YES is determined in step S1211, ACGlevel is set to 0 (step S1212), LVacg is set to 5 (step S1213), and then the ACG input interrupt process is terminated. If NO is determined in step S1211, ACGlevel is set to 1 (step S1214), LVacg is set to 2 (step S1215), and the ACG input interrupt process is terminated.

If ACGave is higher than ACGth2 in step S1210, the process proceeds to step S1216 to set the ACG limiting level similarly to steps S1211 to S1215. First, in step S1216, it is determined whether ACGlevel is set to 1 and ACGave is equal to or lower than a threshold value ACGhys2. The ACGhys2 is higher than ACGth2 and for use in determining whether the ACG limiting level is level 1 or level 2 when the ACG cycle becomes longer. ACGhys2 is assumed to be about 10% higher than ACGth2, for example. If YES is determined in step S1216, ACGlevel is set to 1 (step S1217), LVacg is set to 2 (step S1218), and then the ACG input interrupt process is terminated. If NO is determined in step S1216, ACGlevel is set to 2 (step S1219), LVacg is set to 1 (step S1220), and the ACG input interrupt process is terminated.

In the aforementioned process, it is assumed that ACGth2 is 0.04 sec (the number of engine revolutions: 1500 rpm), ACGhys1 is 0.033 sec (the number of engine revolutions: 1800 rpm), and ACGhys2 is 0.044 sec (the number of engine revolutions: 1350 rpm). In this condition, the upper limit electric energy to the heater 2 is set to level 2 if the ACG cycle is 0.0375 sec (the number of engine revolutions is 1600 rpm) and the level of the upper limit electric energy to the heater 2 is set to level 1 if the ACG cycle is 0.05 sec (the number of engine revolutions is 1200 rpm). This process enables setting of the upper limit electric energy appropriate and consistent with the amount of power generation of the generator 9, whereby the electric energy supplied to the heater 2 does not increase excessively relative to the amount of power generation of the generator 9 and then the electric energy supplied to the heater 2 can be controlled so as to suppress the electric power consumption of the battery. More specifically, if the number of revolutions and the amount of power generation of the generator 9 are relatively low, it is possible to control the electric energy to the heater 2 so as to be decreased. Thereby, it is possible to increase the opportunity to enable the heater 2 to warm the grip while suppressing the voltage drop of the battery 10.

Figure 13:
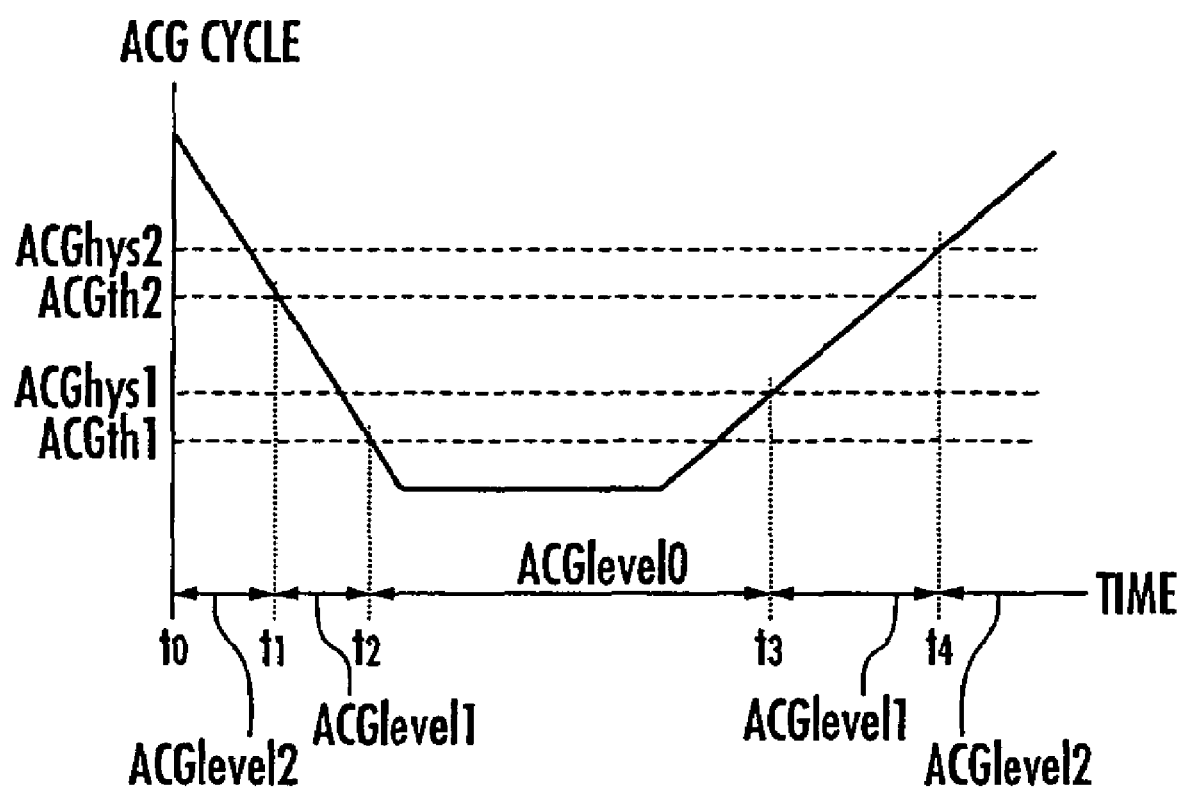
FIG. 13 is a graph showing a relation between an ACG cycle and the upper limit electric energy to the heater in the grip heater control apparatus shown in FIG. 2.

The following describes in detail a method of setting the upper limit electric energy to the heater 2 in the ACG input interrupt process with reference to FIG. 13. Referring to FIG. 13, there is shown a graph illustrating a relation between an ACG cycle indicating the number of revolutions of the engine or generator 9 and the upper limit electric energy to the heater 2, having an axis of abscissa representing time and an axis of ordinate representing ACG cycle. If the ACG cycle varies as indicated by the solid line in FIG. 13, the ACG limiting level ACGlevel is set to 2 at time t0, first (the upper limit electric energy to the heater 2 is set to level 1). During the time period t0 to t1 in which the ACG cycle is getting shorter, ACGlevel remains at 2 (the upper limit electric energy to the heater 2 remains at level 1). If the ACG cycle decreases to be lower than the threshold ACGth2, ACGlevel is set to 1 (the upper limit electric energy to the heater 2 is set to level 2). If the ACG cycle further decreases to be equal to or lower than ACGth1 at time t2, ACGlevel is set to 0 (the upper limit electric energy to the heater 2 is set to level 5 (the maximum level)), whereby the limitation on the electric energy to the heater 2 is substantially removed. The electric energy to the heater 2 continues to be released from the limitation during the time period from t2 to t3. When the ACG cycle increases thereafter to be equal to or higher than ACGhys1 at time t3, ACGlevel is set to 1 (the upper limit electric energy to the heater 2 is set to level 2). When the ACG cycle increases to be equal to or higher than ACGhys2 at time t4, ACGlevel is set to 2 (the upper limit electric energy to the heater 2 is set to level 1). By determining the level LVacg of the upper limit electric energy to the heater 2, the change in the upper limit electric energy relative to the change in the number of engine revolutions can be provided with hysteresis characteristics, thereby preventing an unstable operation, which may be caused by changes in the upper limit electric energy frequently repeated due to the variation in the number of revolutions of the engine.

While the vehicle is a motorcycle in this embodiment, it may be a snowmobile, a wet bike, or the like.

What is claimed is:

1. A grip heater control apparatus, comprising:
   a heater for generating heat by electric power supplied from a battery, the heater being provided in a grip of a steering handle of a vehicle having an engine as a propulsive source,
   a generator for generating electricity depending on the rotation of the engine, the battery being charged by the generator;
   a heater control unit for controlling the electric energy supplied to the heater from the battery,
   a heater temperature actuator operated by a driver for adjusting a temperature of the heater;
   an operation signal output unit for outputting a signal corresponding to an operation of the heater temperature actuator; and
   a target electric energy setting unit for setting a target electric energy to the heater based on an output of the operation signal output unit,
   wherein a revolutions detecting unit is provided for detecting the number of revolutions of the engine or the generator,
   wherein the heater control unit includes an upper limit determining unit for determining an upper limit of the electric energy supplied to the heater depending on the number of revolutions detected by the revolutions detecting unit, and
   wherein the heater control unit controls the electric energy supplied to the heater to be a lower one of the target electric energy and the upper limit electric energy.

2. The grip heater control apparatus according to claim 1, wherein the heater control unit controls the electric energy supplied to the heater to be lower than the upper limit electric energy at least when the detected number of revolutions is equal to or lower than a predetermined number of revolutions.

3. The grip heater control apparatus according to claim 1, wherein the heater control unit controls the electric energy supplied to the heater to be equal to or lower than the upper limit electric energy.

4. The grip heater control apparatus according to claim 3, wherein the heater control unit controls the electric energy supplied to the heater to be a lower one of the target electric energy and the upper limit electric energy when the detected number of revolutions is equal to or lower than a predetermined number of revolutions, and
   wherein the heater control unit controls the electric energy to the heater to be the target electric energy when the detected number of revolutions is higher than the predetermined number of revolutions.

5. The grip heater control apparatus according to claim 3, wherein the upper limit electric energy determining unit determines the upper limit electric energy to be a value equal to or higher than the target electric energy when the detected number of revolutions is higher than a predetermined number of revolutions.

6. The grip heater control apparatus according to claim 3, wherein the upper limit electric energy determining unit sequentially compares the detected number of revolutions with a predetermined threshold and determines the upper limit electric energy while changing the upper limit in stages according to a change in a magnitude relationship between the number of revolutions and the predetermined threshold,
   wherein said predetermined threshold is a first threshold when the number of revolutions is increasing and said predetermined threshold is a second threshold when the number of revolutions are decreasing.

7. The grip heater control apparatus according to claim 1, further comprising:
   a battery voltage detecting unit for detecting the battery voltage,
   wherein if the battery voltage detected drops to a predetermined voltage or lower, the heater control unit stops supplying electricity to the heater.

8. The grip heater control apparatus according to claim 2, further comprising:
   a battery voltage detecting unit for detecting the battery voltage,
   wherein if the battery voltage detected drops to a predetermined voltage or lower, the heater control unit stops supplying electricity to the heater.

* * * * *